(12) United States Patent
Hayashi et al.

(10) Patent No.: US 10,365,490 B2
(45) Date of Patent: Jul. 30, 2019

(54) HEAD-MOUNTED DISPLAY, HEAD-UP DISPLAY AND PICTURE DISPLAYING METHOD

(71) Applicant: MAXELL, LTD., Kyoto (JP)

(72) Inventors: Shingo Hayashi, Tokyo (JP); Satoshi Ouchi, Tokyo (JP); Yoshiho Seo, Tokyo (JP); Tomoto Kawamura, Tokyo (JP); Seiji Murata, Tokyo (JP); Takahiro Matsuda, Tokyo (JP); Toshiteru Nakamura, Tokyo (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/574,210

(22) PCT Filed: May 19, 2015

(86) PCT No.: PCT/JP2015/064336
§ 371 (c)(1),
(2) Date: Nov. 15, 2017

(87) PCT Pub. No.: WO2016/185563
PCT Pub. Date: Nov. 24, 2016

(65) Prior Publication Data
US 2018/0129050 A1    May 10, 2018

(51) Int. Cl.
*G06F 1/00* (2006.01)
*G02B 27/01* (2006.01)
(Continued)

(52) U.S. Cl.
CPC ....... *G02B 27/0172* (2013.01); *G09B 21/008* (2013.01); *G09G 3/001* (2013.01);
(Continued)

(58) Field of Classification Search
CPC .......... G02B 7/30; G02B 27/00; G02B 27/01; G02B 23/12; H04N 9/097; G09G 5/02
See application file for complete search history.

(56) References Cited

U.S. PATENT DOCUMENTS 10,044,938 B2 * 8/2018 Schloter ............. H04N 5/23293
2002/0196355 A1 * 12/2002 Hiroshige .............. H04N 9/646
348/252
(Continued)

FOREIGN PATENT DOCUMENTS

JP    10-191204 A    7/1998
JP    2003-061105 A    2/2003
(Continued)

OTHER PUBLICATIONS

International Search Report of PCT/JP2015/064336 dated Aug. 11, 2015.

*Primary Examiner* — Michael A Faragalla
(74) *Attorney, Agent, or Firm* — Mattingly & Malur, PC

(57) ABSTRACT

A head-mounted display (101) includes: an imaging assembly (203) imaging scenery seen by a user to generate a source picture; a storage unit (202) storing color correction factors used for correcting brightness of each of a red, green and blue color components included in a picture; a correction picture generator (212) performing color correction processing for enhancing a color component with a relatively low color correction factor stored in the storage unit (202), of the red, green and blue color components forming the source picture, to generate a correction picture; a picture display assembly (207) displaying the correction picture in the field of view of the user under a condition where he/she is able to perceive the outside world; and a special picture processor (213) performing picture processing for overlaying the correction picture and the source picture on each other for display.

14 Claims, 21 Drawing Sheets

(51) Int. Cl.
*G09G 3/20* (2006.01)
*G09G 5/02* (2006.01)
*G09G 5/377* (2006.01)
*G09G 3/00* (2006.01)
*H04N 9/097* (2006.01)
*G09B 21/00* (2006.01)
*H04N 9/31* (2006.01)
*H04N 5/64* (2006.01)
*G06T 1/60* (2006.01)

(52) U.S. Cl.
CPC ............... *G09G 3/20* (2013.01); *G09G 5/02* (2013.01); *G09G 5/377* (2013.01); *H04N 9/097* (2013.01); *H04N 9/3182* (2013.01); *H04N 9/3194* (2013.01); *G06T 1/60* (2013.01); *G09G 2320/0233* (2013.01); *G09G 2320/0242* (2013.01); *G09G 2340/10* (2013.01); *G09G 2380/08* (2013.01); *G09G 2380/10* (2013.01); *H04N 5/64* (2013.01)

(56) References Cited

U.S. PATENT DOCUMENTS

| | | | | |
|---|---|---|---|---|
| 2010/0117943 A1* | 5/2010 | Pak | ............ | G02F 1/133512 345/89 |
| 2013/0241947 A1* | 9/2013 | Hirota | ............ | G09G 5/005 345/589 |
| 2016/0084661 A1* | 3/2016 | Gautama | ............ | G01C 21/365 701/400 |

FOREIGN PATENT DOCUMENTS

| | | |
|---|---|---|
| JP | 2006-208451 A | 8/2006 |
| JP | 2008-280026 A | 11/2008 |
| JP | 2012-121527 A | 6/2012 |
| JP | 2013-042446 A | 2/2013 |
| JP | 2014-165768 A | 9/2014 |

* cited by examiner

HEAD-MOUNTED DISPLAY, HEAD-UP DISPLAY AND PICTURE DISPLAYING METHOD

TECHNICAL FIELD

The present invention relates to a head-mounted display, a head-up display and a picture displaying method.

BACKGROUND ART

The human retinal contains three types of cones, red cones sensitive to long wavelength (red range), green cones sensitive to middle wavelength (green range) and blue cones sensitive to short wavelength (blue range). It is thought that, upon light entering the eye, the cones respond to the light to allow us to recognize colors according to red wavelength, green wavelength and blue wavelength of the incoming light. The color recognition differs depending on the sensitivities of the three types of cones, that is, color vision properties. For example, a person having a lower sensitivity of red cones sensitive to a red range recognizes colors with less red component. Therefore, the difference between the red color and the brown color in the scenery that the person is looking becomes hard to discern. As described above, color perception varies from person to person.

For this reason, as a color-vision assist device designed for persons with less ability to identify colors such that they can perceive the same colors of the scenery as those perceived by persons with standard visual sensitivity, Patent Literature 1 discloses the configuration "including: a color camera taking outside pictures and generating image data for each color; a lookup table storing input/output characteristics for each color in image data; a multiplier for amplifying the output of the lookup table at a preset gain; a display assembly for reproducing the multiplier output in an image; and a projection lens for projecting the image reproduced by the display assembly on a pupil, in which the image data for each color obtained by the shooting is converted to image data made available to a wearer for easy color discrimination, for display (excerpts from abstract)".

CITATION LIST

Patent Literature

Patent literature 1: Japanese Unexamined Patent Application Publication No. 2014-165768

SUMMARY OF INVENTION

Technical Problem

In Patent Literature 1, the brightness of each of red, green and blue color components of the shot picture is amplified according to color vision properties, and then the amplified picture is projected on the eye by an immersive head-mounted display. This enables the user to perceive the colors of the indirectly taken picture with correct colors.

However, in Patent Literature 1, due to the immersive head-mounted display, there is a disadvantage that the user cannot easily get a sense of perspective because he/she cannot look directly the scenery, and/or the user's visual field may be obstructed in the event a failure occurs in the apparatus.

To address this, if the techniques of Patent Literature 1 is attempted to be applied to a see-through head-mounted display allowing the wearers to perceive the real outside world, instead of the immersive head-mounted display, this raises new issues that, because the wearers of the head-mounted display perceives colors while seeing directly the scenery (real image) through the picture (virtual image), there is need for alignment of a display position such that the picture (virtual image) and the scenery (real image) are superimposed on each other, and because the wearer perceives colors resulting from a mixture of the picture and the scenery, he/she cannot correctly perceive colors of the scenery.

The present invention has been made in view of the above problems, and it is an object of the present invention to provide a technology for the user to be able to perceive correct colors while seeing directly scenery.

Solution to Problem

This object can be achieved by the configuration disclosed in claims by way of example. Although the present invention includes some solutions to solve the above-described problems, as an example thereof, a head-mounted display may be described, which includes: an imaging assembly that images scenery which is being seen by a user; a storage unit that stores color correction factors used for correcting brightness of each color component of a red color component, a green color component and a blue color component included in a source picture imaged by the imaging assembly; a correction picture generator that performs color correction processing for enhancing a color component with a relatively low color correction factor of the color correction factors stored in the storage unit, on the red color component, green color component and blue color component forming the source picture, to generate a correction picture; a picture display assembly that displays the correction picture in the field of view of the user under a condition where he/she is able to perceive outside world; and a special picture processor that performs picture processing for overlaying the correction picture and the source picture on each other for display.

Advantageous Effects of Invention

According to the present invention, a technology for the user to be able to perceive correct colors while seeing directly scenery can be provided. It should be noted that the above and other problems, configurations and advantages will be apparent from the following description of embodiments.

DESCRIPTION OF EMBODIMENT

Embodiments of the present invention will now be described in detail with reference to the drawings. It should be noted that the following description is intended to describe an embodiment of the present invention, and should not be construed in any way to limit the scope of the present invention. Thus, those skilled in the art will be able to employ any embodiment of replacing each or all of those elements with equivalent(s) thereof, and any of such embodiments fall within the scope of the present invention.

First Embodiment

Figure 1:
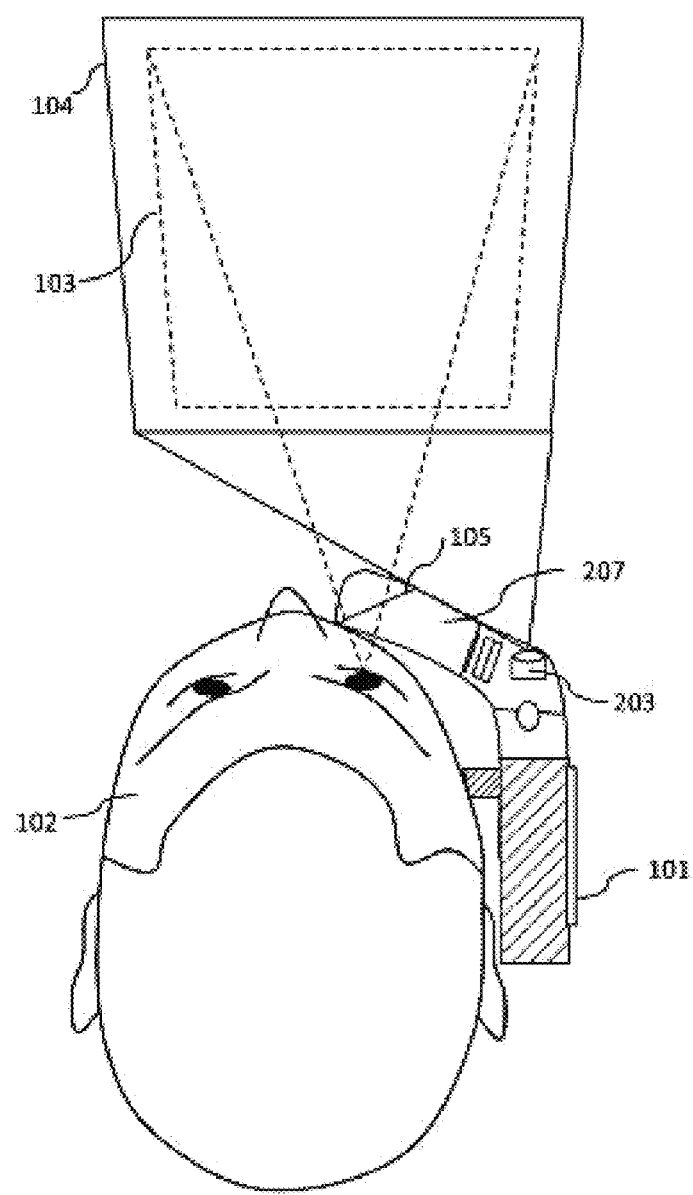
FIG. 1 is a schematic diagram illustrating an aspect of a see-through head-mounted display according to a first embodiment.
Figure 2:
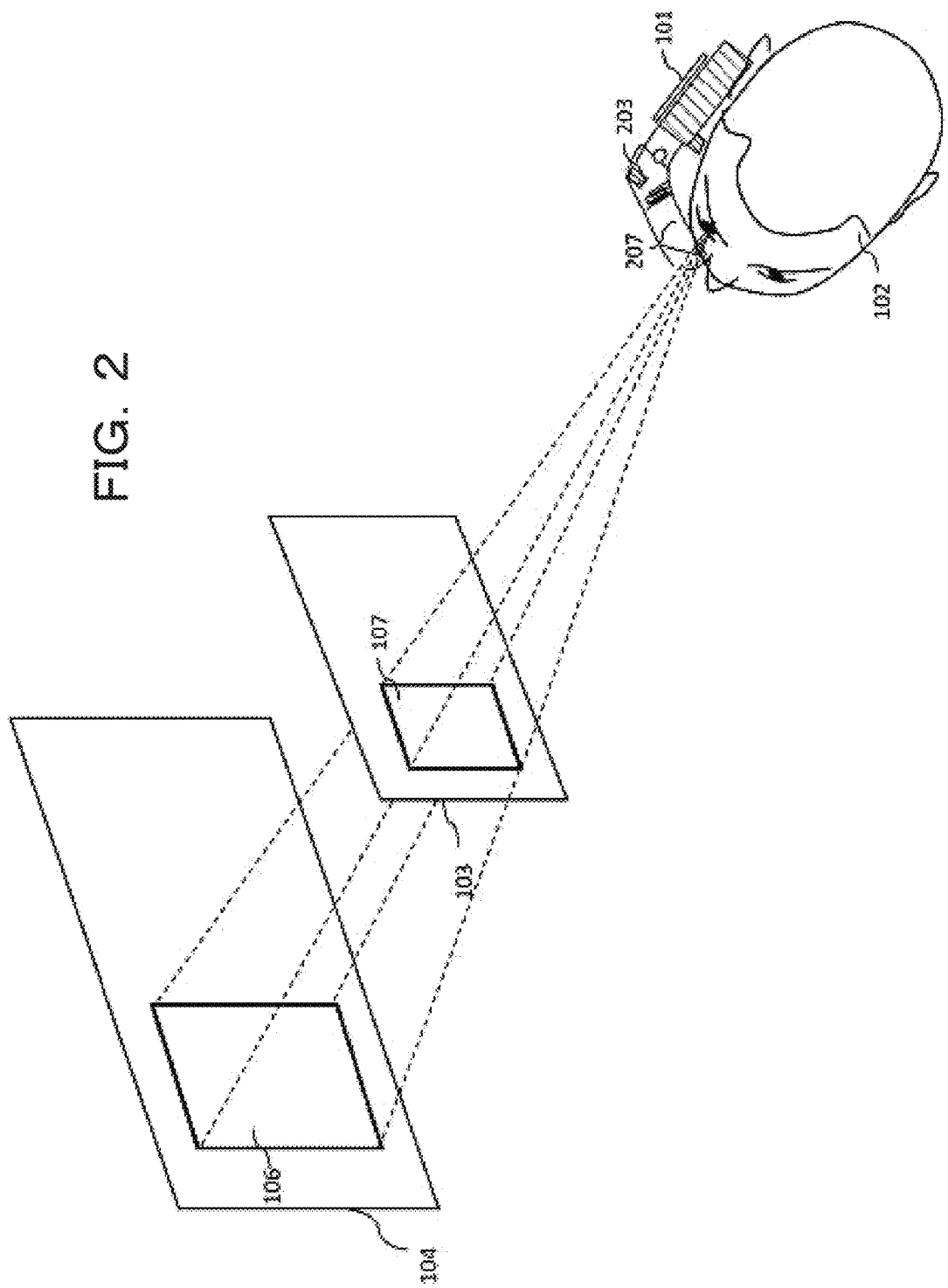
FIG. 2 is a schematic diagram illustrating the manner in which the user perceives colors while he/she is looking scenery through a picture.

In a first embodiment, a head-mounted display is described as a color vision assist device allowing the user to perceive correct colors while seeing directly scenery, by way of example. An overview of a see-through head-mounted display according to a first embodiment is described with reference to FIG. 1 and FIG. 2. FIG. 1 is a schematic diagram illustrating an aspect of the see-through head-mounted display according to the embodiment. FIG. 2 is a schematic diagram illustrating the manner in which the user perceives colors while he/she is seeing scenery through a picture.

A see-through head-mounted display 101 illustrated in FIG. 1 (hereinafter abbreviated as a "head-mounted display 101") is a see-through head-mounted display which is worn on a head 102 of a user and is equipped with a picture display assembly 207 that causes a picture to be displayed in a partial field of or the full field of view of the user under a condition where he/she is able to see the outside world, and an imaging assembly 203 that takes a picture of a partial field of or the full field of view of the user. The picture display assembly 207 includes a picture projector 105 that projects video light to generate a virtual image. The picture projector 105 displays a picture (virtual image) onto an area 103 within the field of view of the user. Also, the imaging assembly 203 takes a picture of an area 104 within the field of view of the user. Hereinafter, the area 103 will be referred to as a "picture display area", and the area 104 will be referred to as an "imaged area".

The picture display assembly 207 may be configured to transfer a picture displayed on, for example, a liquid crystal, a digital micromirror device or the like, into the field of view of the user by means of predetermined optical means using a lens, a hologram, optical fibers and/or the like, to cause an image to be formed on the retina of the user to be perceived as a picture.

The imaging assembly 203 may be configured to use, for example, a camera or the like, to image a partial field or the full field of view of the user. A picture of scenery imaged by the imaging assembly 203 corresponds to a source picture. Then, a color calibration is performed on the source picture to obtain a picture (correction picture), which is then superimposed on the scenery for display. Note that the processing for superimposing of the correction picture on the scenery corresponds to processing for exact alignment of a size and a position of the correction picture with those of the source picture of the scenery.

With reference to FIG. 2, the positional relationship between the picture of the head-mounted display 101 in FIG. 1 and the scenery seen directly by the user is described. Reference sign 106 in FIG. 2 denotes the scenery included in the imaged area of the imaging assembly 203, and reference sign 107 denotes the picture (correction picture) in the picture display area. The light coming from the scenery 106 of the imaged area reaches the eye as shown by broken lines of FIG. 2. Because of this, in order for the user to perceive colors while directly seeing scenery through a picture, the picture 107 in the picture display area is required to be displayed such that the scenery and the picture are superimposed on each other along the broken lines of FIG. 2. As a result, the light of the scenery 106 in the imaged area and the light of the picture 107 in the picture display area reach, in an overlaid state, the eye of the user of the see-through head-mounted display 101. That is, on the same broken line, a color component in the scenery 106 and a color component of the picture 107 are mixed, which then reaches the user's eye.

Figure 3:
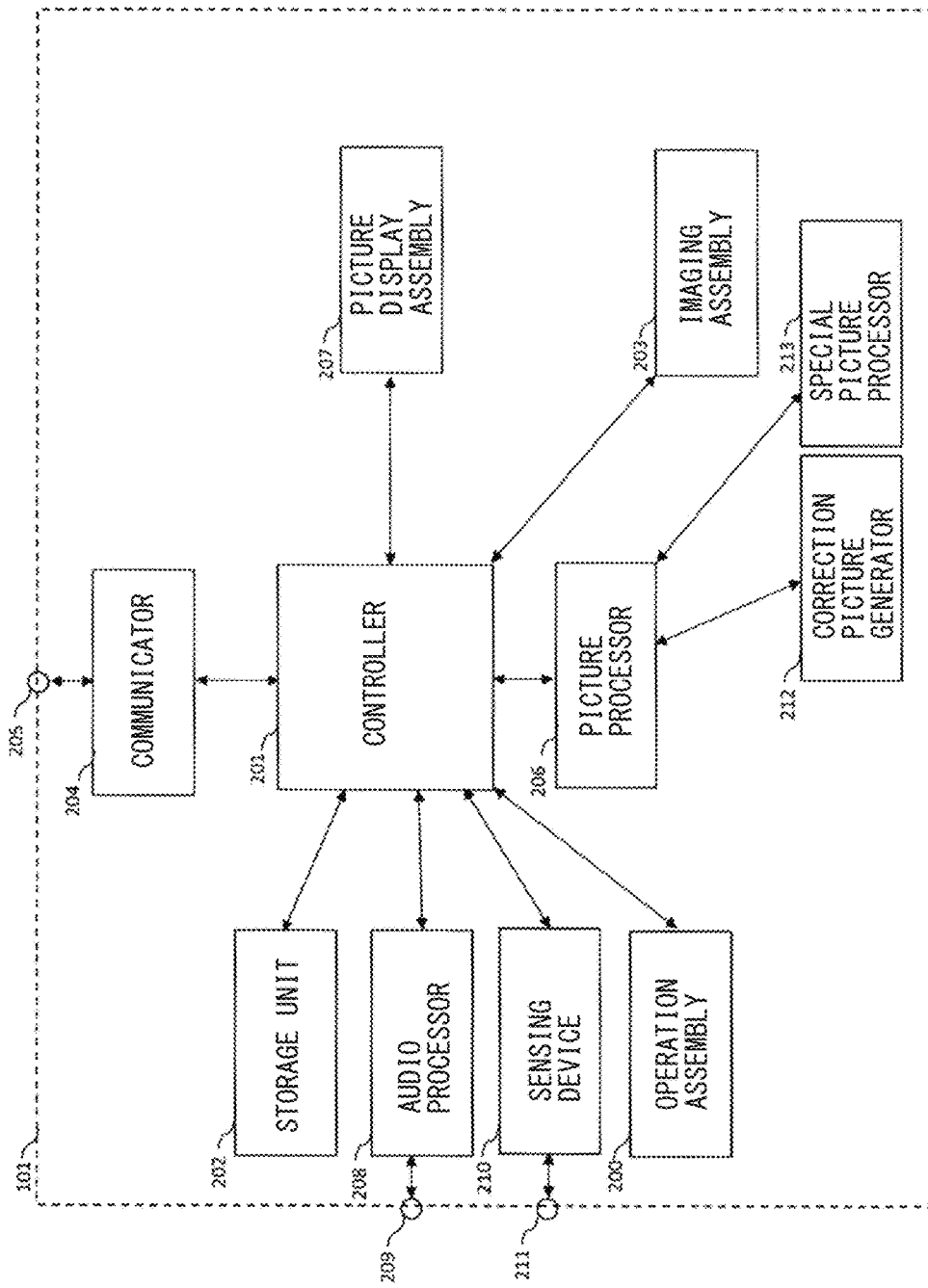
FIG. 3 is a block diagram illustrating an example configuration of the head-mounted display.
Figure 4:
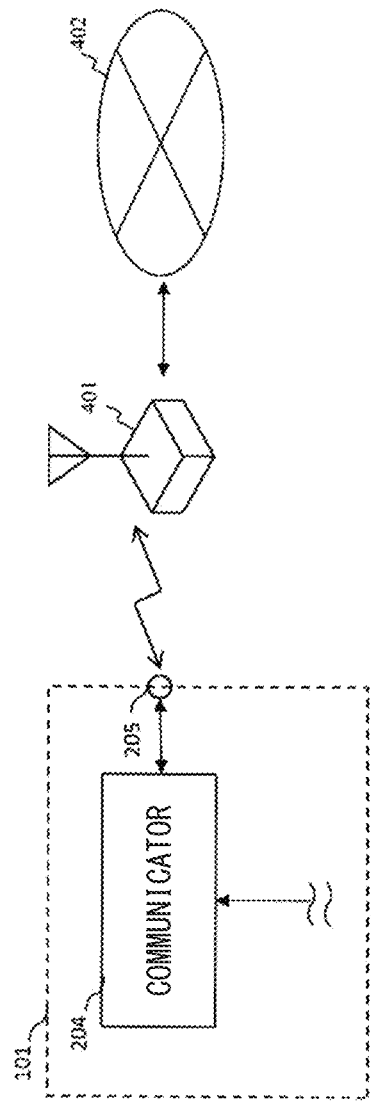
FIG. 4 is a diagram illustrating an example implementation of communication connection of the head-mounted display.

An overview of the configuration of the head-mounted display will now be described with reference to FIG. 3 and FIG. 4. FIG. 3 is a block diagram illustrating an example configuration of the head-mounted display 101. FIG. 4 is a diagram illustrating an example implementation of communication connection of the head-mounted display.

As illustrated in FIG. 3, the head-mounted display 101 includes a controller 201 for controlling the overall head-mounted display 101. In addition, the head-mounted display 101 includes the following constituent components connected to the controller 201, specifically, an operation assembly 200, a storage unit 202, the imaging assembly 203, a communicator 204, a picture processor 206, the picture display assembly 207, an audio processor 208, and a sensing device 210. In addition, the head-mounted display 101 includes: a communication input/output assembly 205 for communication with an external communication equipment connected to the communicator 204; an audio input/output assembly 209 corresponding to a microphone and/or earphones connected to the audio processor 208; a sensor input/output assembly 211 connected to the sensing device 210 and serving as connection interface of various sensors; and a correction picture generator 212 and a special picture processor 213 which are connected to the picture processor 206.

The operation assembly 200 is a user interface for the user to input instructions to the head-mounted display 101, which includes, for example, a hard button and/or a dial member.

The storage unit 202 stores color correction factors stored therein used for correction of brightness of each color component of red, green and blue colors of a picture. The color correction factor can be set based on the color vision property representing visual sensitivity to each color component of respective red, green and blue colors of the user. In addition, the color correction factor can be set to suit preferences of the user. A method of setting the color correction factor will be described later.

The imaging assembly 203 takes a picture of scenery which the user is looking.

The communicator 204 is connected to a network via the communication input/output assembly 205 by wireless communications. For example, the head-mounted display 101 is configured to be connected to a base station 401 for the Internet or the like shown in FIG. 4 to acquire information over the Internet 402. Also, the head-mounted display 101 may be in communication with an information terminal (such as a smartphone, tablet terminal, PC and the like) in another enclosure via the communication input/output assembly 205 over short-range/long-range wireless communication such as Bluetooth (registered trademark), Wifi (registered trademark), UHF, VHF and the like, in order to connect the Internet and the like through the information terminal. Further, an information terminal may be configured to perform later-described color correction processing and then transmit the picture signal after the color correction processing (correction picture) to the head-mounted display 101 such that the picture projector 105 of the head-mounted display may project the picture.

The audio processor 208 performs processing to convert an analog audio signal received from the audio input/output assembly 209 to a digital signal or to convert an audio signal to be output to the audio input/output assembly 209 from a digital signal to an analog signal.

The sensor input/output assembly 211 can allow for installation of a plurality of sensors for: detection of position, orientation and movements of the user such as an inclination sensor, an acceleration sensor and the like; detection of user's body conditions such as a line-of-sight sensor, a temperature sensor and the like; use as an input/output interface detecting input of user's instructions such as a pressure-sensitive sensor, a capacitive sensor and the like; detection of user's wearing or non-wearing by a proximity sensor; and/or the like. The sensing device 210 performs processing to determine based on sensor signals from the sensor input/output assembly 211 whether there is a detection signal or not.

The special picture processor 213 generates a special picture, such as e.g., a 3D video, AR (Augmented Reality), VR (Virtual Reality) and the like.

The following description is for primary constituent components of the head-mounted display 101 as a color vision assist device allowing the user to be able to perceive correct colors while seeing directly the scenery, in which the picture processor 206, the correction picture generator 212 and the special picture processor 213 will be described in detail.

Initially, upon the imaging assembly 203 imaging scenery, the picture processor 206 generates a picture (source picture) on the basis of a signal generated by the imaging by the imaging assembly 203. The correction picture generator 212 generates a correction picture by performing color correction processing on the red, green and blue color components of the picture generated in the picture processor 206 to perform brightness enhancement according to a color correction factor of each of the red, green and blue colors on the basis of the color correction factors stored in the storage unit 202.

The following description is an instance of the color correction processing using a color correction factor. Note that the case of different sensitivities of the user is described here, but the embodiment is not limited to the color correction processing performed for different sensitivities. The embodiment can be applied when the user enhances any of the red, blue and green colors at an arbitrary level even if the user's sensitivity is equal to red, blue and green colors.

Here, assuming that: the color correction factors of the red, green and blue colors stored in the storage unit 202 are defined respectively as $\alpha(red)$, $\alpha(green)$ and $\alpha(blue)$; the brightnesses of the red, green and blue color components of the picture (source picture) generated by the picture processor 206 are defined respectively as $R(red)$, $G(green)$ and $B(blue)$; and also brightnesses of the respective red, green and blue colors of a picture (correction picture) of which the brightness is enhanced to augment a color component with a low color correction factor are defined respectively as $R(correction)$, $G(correction)$ and $B(correction)$, each of the brightnesses can be calculated by use of an equation (1), (2), (3), where each of $\alpha(red)$, $\alpha(green)$ and $\alpha(blue)$ is a value ranging from 0 to 1.

$$R(correction) = R(red) \times (1-\alpha(red))/\alpha(red) \quad (1)$$

$$G(correction) = G(green) \times (1-\alpha(green))/\alpha(green) \quad (2)$$

$$B(correction) = B(blue) \times (1-\alpha(blue))/\alpha(blue) \quad (3)$$

Figure 5:
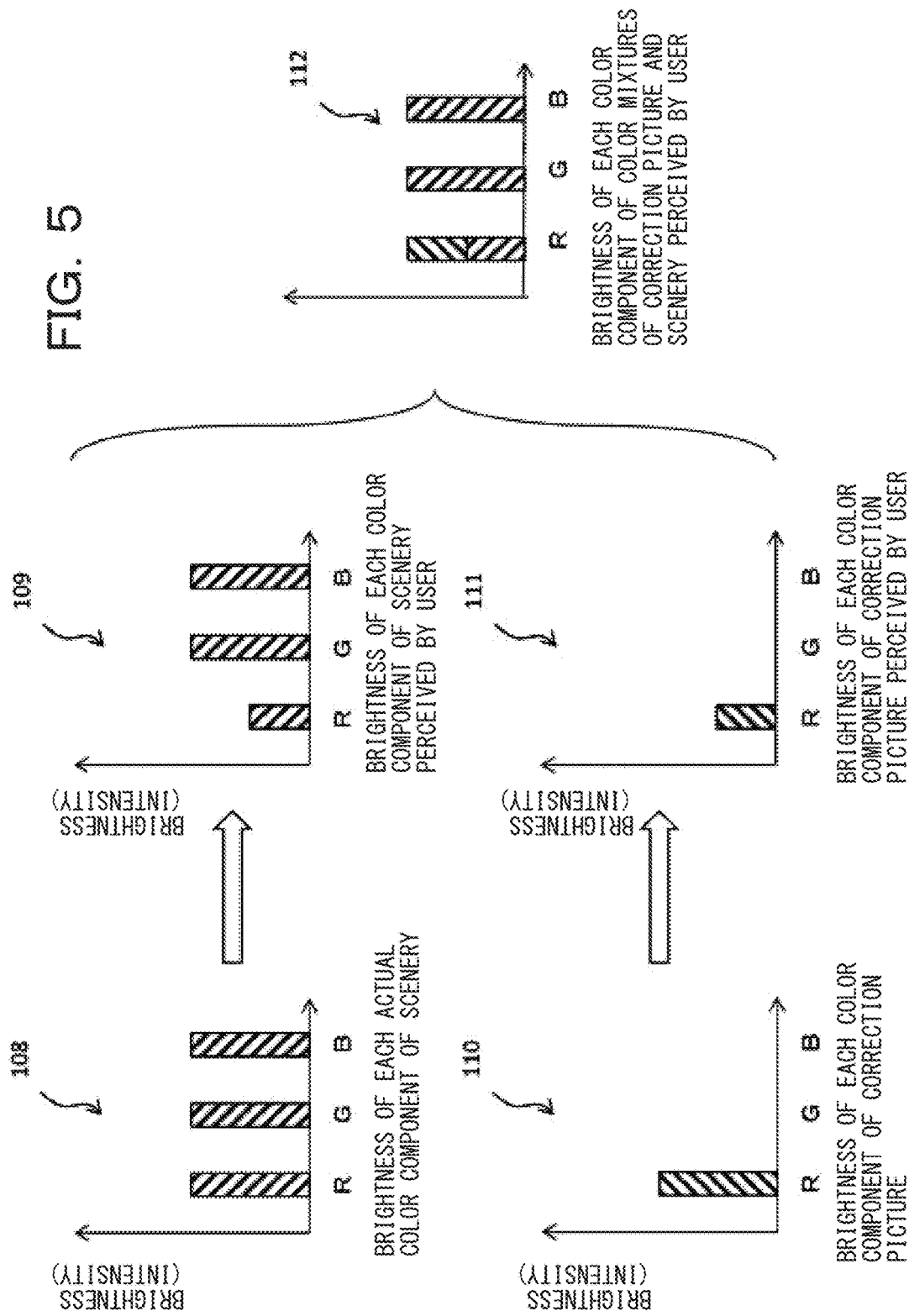
FIG. 5 shows an intensity diagram for each color component.

The following describes the manner in which the user perceives a mixture of color components of scenery and a picture with reference to FIG. 5. FIG. 5 shows an intensity diagram for each color component. In FIG. 5, assuming that the user is most sensitive to green and blue, and a red sensitivity (color correction factor) is 50 percent of them, that is, $\alpha(red)=0.5$, $\alpha(green)=1$, and $\alpha(blue)=1$. In this case, the user perceives scenery having a tone with the red color reduced by one-half (see reference sign 109 in FIG. 5) of the brightness of each color component of the scenery (see reference sign 108 in FIG. 5).

To address this, a value of each color component of the correction picture after a color correction is made to the picture (source picture) generated in the picture processor 206 is determined by the following equations (4) to (6).

$$R(\text{correction})=R(\text{red})\times(1-\alpha(\text{red}))/\alpha(\text{red})=R(\text{red}) \quad (4)$$

$$G(\text{correction})=G(\text{green})\times(1-\alpha(\text{green}))/\alpha(\text{green})=0 \quad (5)$$

$$B(\text{correction})=B(\text{blue})\times(1-\alpha(\text{blue}))/\alpha(\text{blue})=0 \quad (6)$$

In equation (4), for an input value R(red), an output value after color correction (the right side of equation (4)) is also R(red). Therefore, a picture signal (intensity 1) equivalent to the input value R(red) is generated. However, because of $\alpha(\text{green})=1$ and $\alpha(\text{blue})=1$, pictures for the green and blue colors are not generated (see reference sign 110 in FIG. 5). When the user perceives the resulting correction picture, he/she perceives also the correction picture having a tone with the red color brightness reduced by one-half (see reference sign 111 in FIG. 5).

Thus, when the user looks scenery through the head-mounted display 101, the user sees the scenery with the colors of the scenery (see reference sign 109 in FIG. 5) and the correction picture (see reference sign 111 in FIG. 5) output from the head-mounted display 101 being mixed (see reference sign 112 in FIG. 5).

In other words, both the brightness of the red color of the original colors (reference sign 108) of the scenery and the brightness of the red color of the correction picture (reference sign 110) reaches the user's eye. Accordingly, the red light reaches the user's eye at twice the brightness (intensity) of the original color of the scenery, but the user's sensitivity to red is 50%. Because of this, the red light perceived by the user results in "doubling"×50%=1, which is equal to the brightness of the original color component of the scenery, as a result of which the user is able to perceive the scenery with correct colors.

In the example, the highest color correction factor ($\alpha(\text{green})$, $\alpha(\text{blue})$) of the color correction factors stored in the storage unit 202 may be used as a reference color correction factor, and for a color component ($\alpha(\text{green})$, $\alpha(\text{blue})$) with a color correction factor higher than one-half of the reference color correction factor, the correction picture generator 212 may generate a darker picture than the picture taken by the imaging assembly 203. Also, for a color component ($\alpha(\text{red})$) with a color correction factor no higher than one-half of the reference color correction factor, the correction picture generator 212 may generate a brighter picture than the picture taken by the imaging assembly 203. Then, the pictures thus generated may be displayed on the picture display assembly 207.

In this manner, a highest color correction factor of the color correction factors of the red, green and blue colors stored in the storage unit 202 is used as a reference color correction factor so that the brightness of a color component with a color correction factor no higher than the reference color correction factor can be perceived as the same brightness of the color component with the reference color correction factor.

If a color correction factor is set based on the user's color vision property representing visual sensitivity to each color component of the red, green and blue colors, the brightness of the color component with lower visual sensitivity can be augmented to be equal to that of the color component with the highest visual sensitivity, enabling the user to perceive the scenery with correct colors.

Alternatively, if a color correction factor is set to suit preferences of the user, colors adapting to the environment around the user is perceivable to the user. For example, if the environment is dark, a component of short-wavelength blues is easily perceived, but a color component of long-wavelength reds is not easily perceived. To address this, the red component is made brighter to be enhanced for easier perception. However, the color component to be enhanced is not limited to the red color. By making a predetermined color component brighter to suit preferences of the user, the user becomes easily perceiving the colors of the scenery.

Further, the special picture processor 213 performs picture processing to superimpose and display the scenery and the correction picture generated by the correction picture generator 212 on each other because the imaging assembly 203 and the picture projector 105 are located away from each other. In the embodiment, as an example of the picture processing, the processing for positional alignment and exact agreement in image size is described. The positional relationship between the imaging assembly 203 and the picture projector 105 depends on the mechanical configuration of the head-mounted display 101. Because of this, the sizes of the bounds, the depths and the relationship of in-plane positions of the imaged area 104 and the picture display area 103 are known. Depending on the mechanical configuration, a picture of the area in which the imaged area 104 and the picture display area 103 are superimposed on each other is trimmed (cut away) and the trimmed picture is displayed by the picture display assembly 207 (projected by the picture projector 105). The processing for display of the segmentation picture by the picture display assembly 207 and superimposition of the segmentation picture on the scenery will be described below with reference to FIG. 6 to FIG. 9B. Note that a calculation method in the trimming processing of the special picture processor 213 described below is not restrictive, and is just one of various methods.

Figure 6:
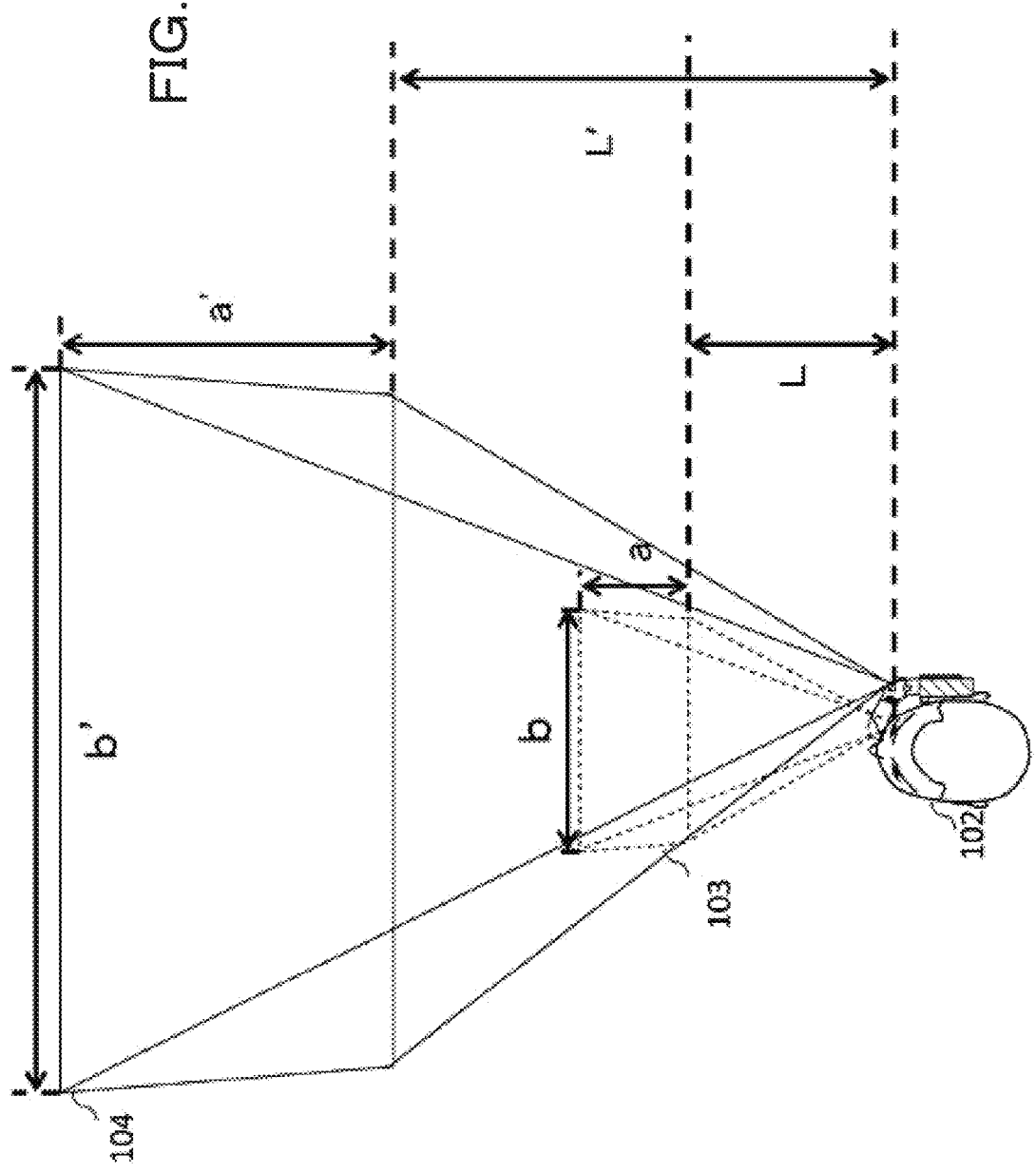
FIG. 6 is a diagram illustrating parameters determined by the mechanical configuration.
Figure 7A:
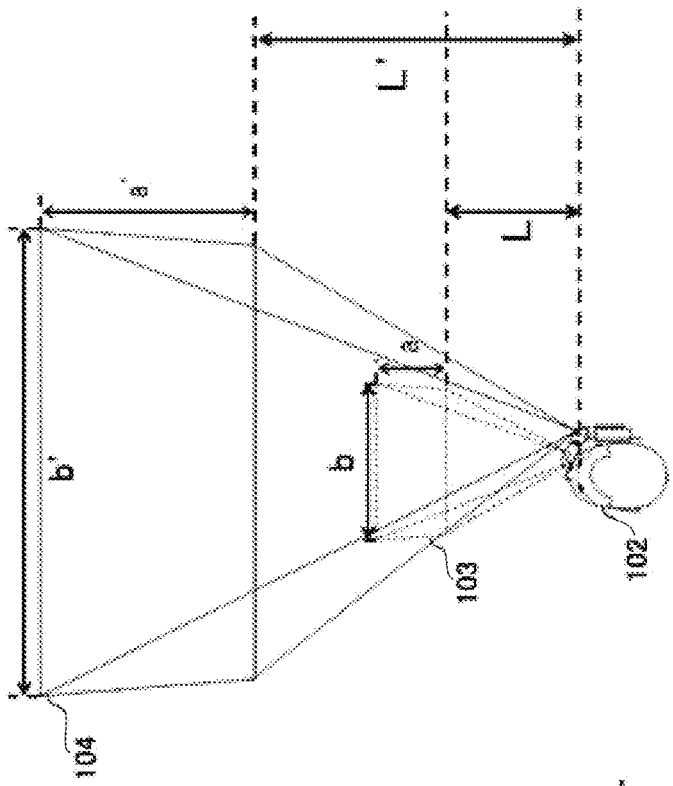
FIG. 7A and FIG. 7B are diagrams illustrating an overview of processing pattern in a special picture processor, FIG. 7A illustrating the case where the distance to an imaged area is equal to the distance to a picture display area, FIG. 7B illustrating the case where the distance to an imaged area is different from the distance to a picture display area.
Figure 7B:
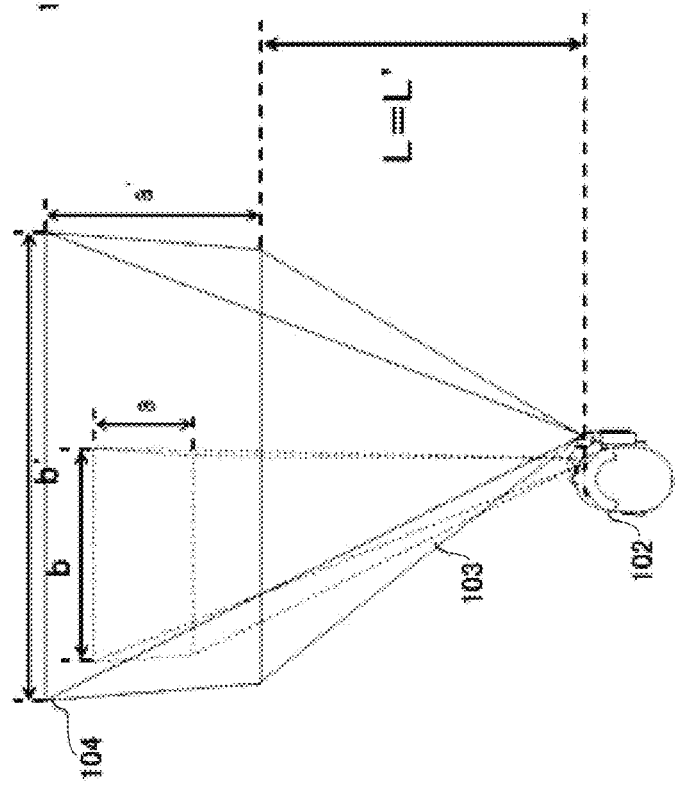
Figure 8A:
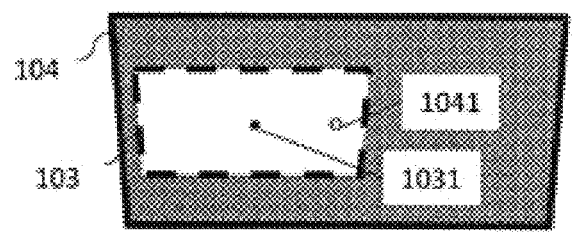
FIGS. 8A, 8B, and 8C are diagrams illustrating the processing in the special picture processor when the distances to the imaged area and the picture display area are equal.
Figure 8B:
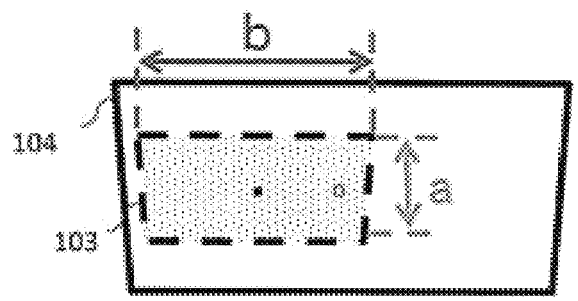
Figure 8C:
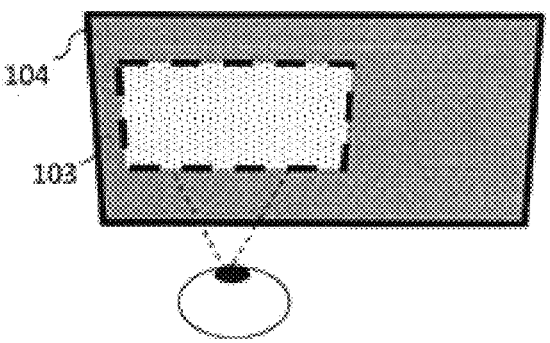
Figure 9:
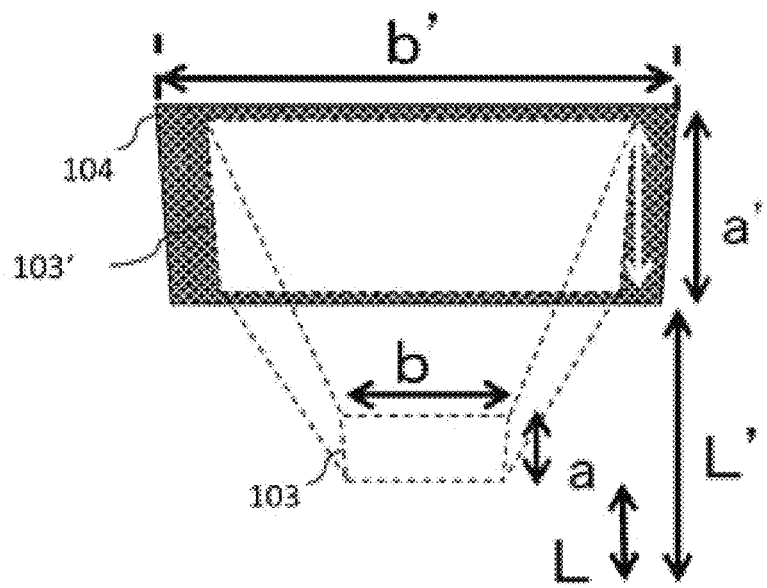
FIGS. 9A and 9B are diagrams illustrating the processing in the special picture processor when the distances to the imaged area and the picture display area are different from each other.
Figure 9:
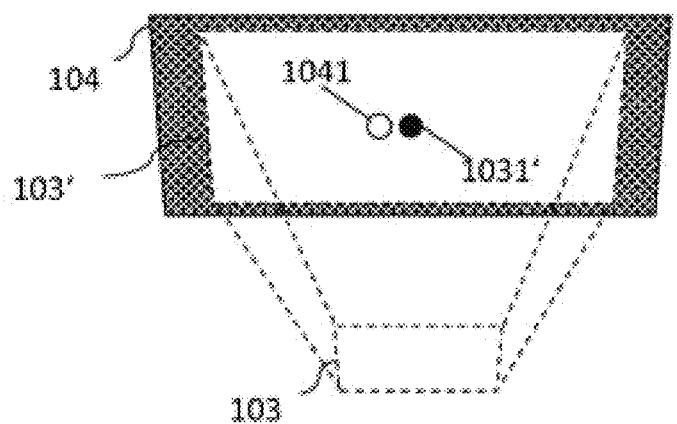

FIG. 6 is a diagram illustrating parameters determined by the mechanical configuration. FIG. 7A and FIG. 7B are diagrams illustrating an overview of processing pattern in the special picture processor, FIG. 7A illustrating the case where the distance to an imaged area is equal to the distance to a picture display area, FIG. 7B illustrating the case where the distance to an imaged area is different from the distance to a picture display area. FIGS. 8A, 8B, and 8C are diagrams illustrating the processing in the special picture processor when the distances to the imaged area and the picture display area are equal. FIGS. 9A and 9B are diagrams illustrating the processing in the special picture processor when the distances to the imaged area and the picture display area are different from each other.

The following parameters can be obtained on the basis of the mechanical configuration where L is the distance from the user to the picture display area, L' is the distance from the user to the imaged area (scenery), a and b are the vertical length and the horizontal length of the picture display area, and a' and b' are the vertical length and the horizontal length of the imaged area, as illustrated in FIG. 6.

$$\text{Size of picture display area/imaged area}=a/a', b/b' \quad (7)$$

$$\text{Distance to picture display area/imaged area}=L/L' \quad (8)$$

The positional relationship between the imaged area and the picture area with respect to the user is divided broadly into two cases, the case where the distances to the imaged area and the picture area are equal, that is, L=L' (FIG. 7A), and the case where the distances to the imaged area and the picture area are different from each other, that is, L≠L' (FIG. 7B). The following description is the processing in the special picture processor 213 in each case.

Initially, the processing in the case where the distances to the imaged area and the picture area are equal (FIG. 7A) is described with reference to FIGS. 8A, 8B, and 8C.

The special picture processor 213, as illustrated in FIG. 8A, identifies a center position 1041 of the imaged area 104 and a center position 1031 of the picture display area 103 (see FIG. 8A).

Then, with respect to the center position 1031 of the picture display area 103, the taken picture within the imaged area 104 is trimmed to the same dimensions as those (vertical length a, horizontal length b) of the picture display area 103 (see FIG. 8B).

The special picture processor 213 causes the picture display assembly 207 to display the trimmed, taken picture (see FIG. 8C). As a result, the trimmed, taken picture can be superimposed on the taken picture (scenery) for display.

Meanwhile, when the distances to the imaged area 104 and the picture display area 103 are different from each other (FIG. 7B), the special picture processor 213 calculates a picture size at a position (L') of the imaged area 104 as shown in FIG. 9A (see FIG. 9A). Vertical size of a picture display area 103' at the position of the imaged area 104:

$$a''=(L'/L) \times a \tag{9}$$

Size of the picture display area 103' at the position of the imaged area 104:

$$b''=(L'/L) \times b \tag{10}$$

Subsequently, a center position 1031' of the picture display area 103' at the position (L') of the imaged area 104 is identified (see FIG. 9B). In this way, the in-plane positional relationship between the actual picture display area 103 and the imaged area 104 can be acquired.

Figure 10:
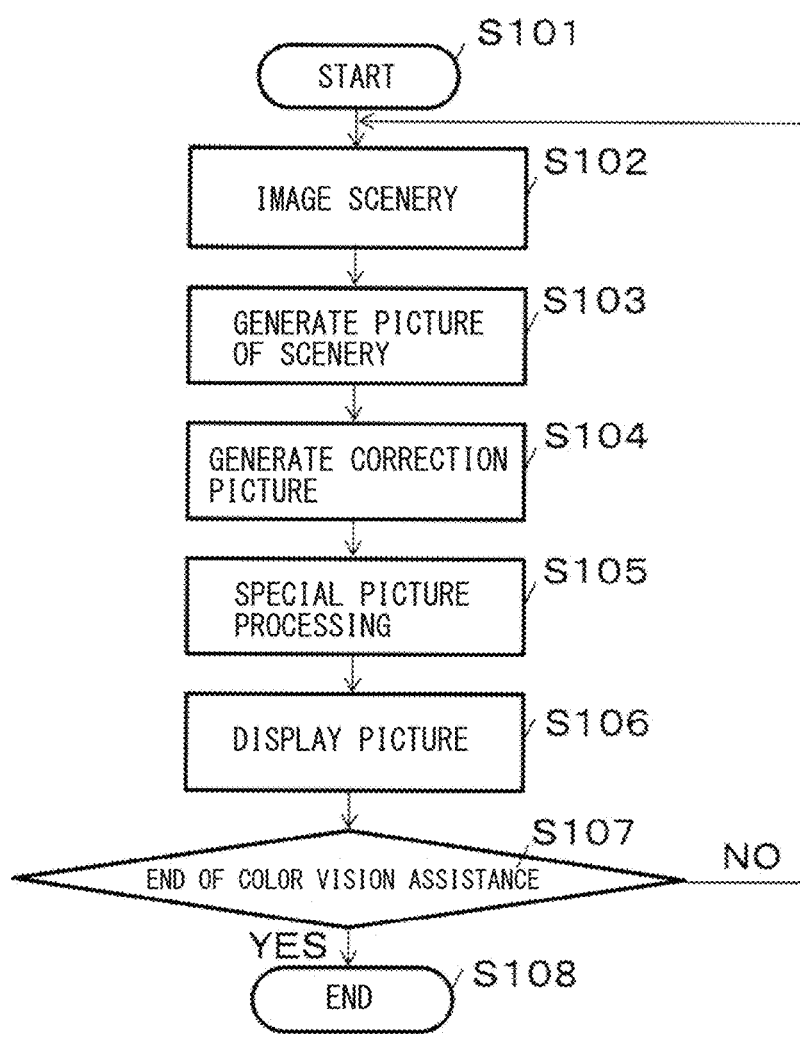
FIG. 10 is a flowchart showing the flow of processing of the operation of the head-mounted display.

The following description with reference to FIG. 10 is the flow of the operation of the head-mounted display 101 serving as the color vision assist device that allows the user to perceive correct colors while directly looking scenery. FIG. 10 is a flowchart showing the processing flow of the operation of the head-mounted display.

As illustrated in FIG. 10, upon the head-mounted display 101 starting operation (S101), the imaging assembly 203 images scenery (S102). The picture processor 206 generates a picture taken by the imaging assembly 203 (S103), and then, based on the red, green and blue color components of the generated picture and the color correction factors stored in the storage unit 202, the correction picture generator 212 generates a picture enhanced in brightness to augment the brightness of an inadequate color component (S104).

The special picture processor 213 performs the trimming processing on the generated picture so that the generated picture and the scenery are overlaid (S105). The picture display assembly 207 displays the picture processed in S105 in the field of view (S106). If the color vision assistance is terminated (S107/Yes), the operation is terminated (S108), and if the color vision assistance is continued (S107/No), the procedure goes to S102 to continue the operation.

Note that a picture to be generated in the picture processor 206 may be changed in range in each pixel or ten pixels for generation. For example, if a picture is generated for a very small range such as in each pixel, the colors of the scenery can be represented more vividly. Expanding the range such as in ten pixels can mitigate the load on the picture processor 206 to accelerate the speed of picture processing.

Although especially not shown, the head-mounted display 101 further may include a line-of-sight detector that detects a line of sight of the user, and a picture range limiter that limits a generation range of the picture taken by the imaging assembly 203 to an area in the vicinity of the line of sight detected by the line-of-sight detector. This makes it possible to reduce the load on the picture processor 206 and also accelerate the speed of picture processing. In addition, a color correction can be made to only a part desired by the user so that only the part can be enhanced.

The color correction factor of a user varies also depending on user's physical condition and advancing age. If the head-mounted display 101 is provided with means configured to acquire a color correction factor appropriate for a user, this enables individually tailored color vision assistance.

Figure 11:
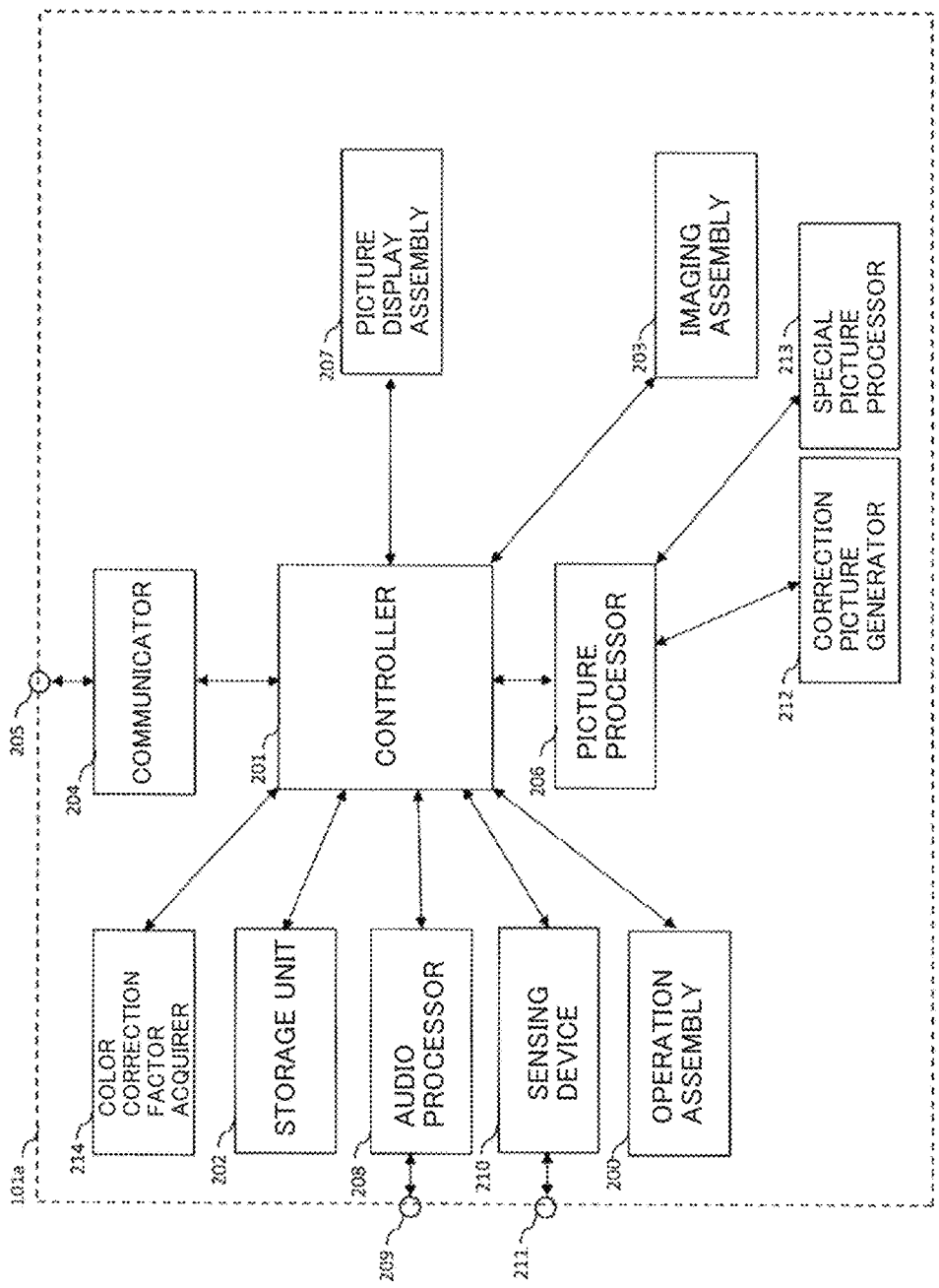
FIG. 11 is a schematic diagram illustrating an example block diagram of a head-mounted display when a color correction factor appropriate for the user is obtained.
Figure 12:
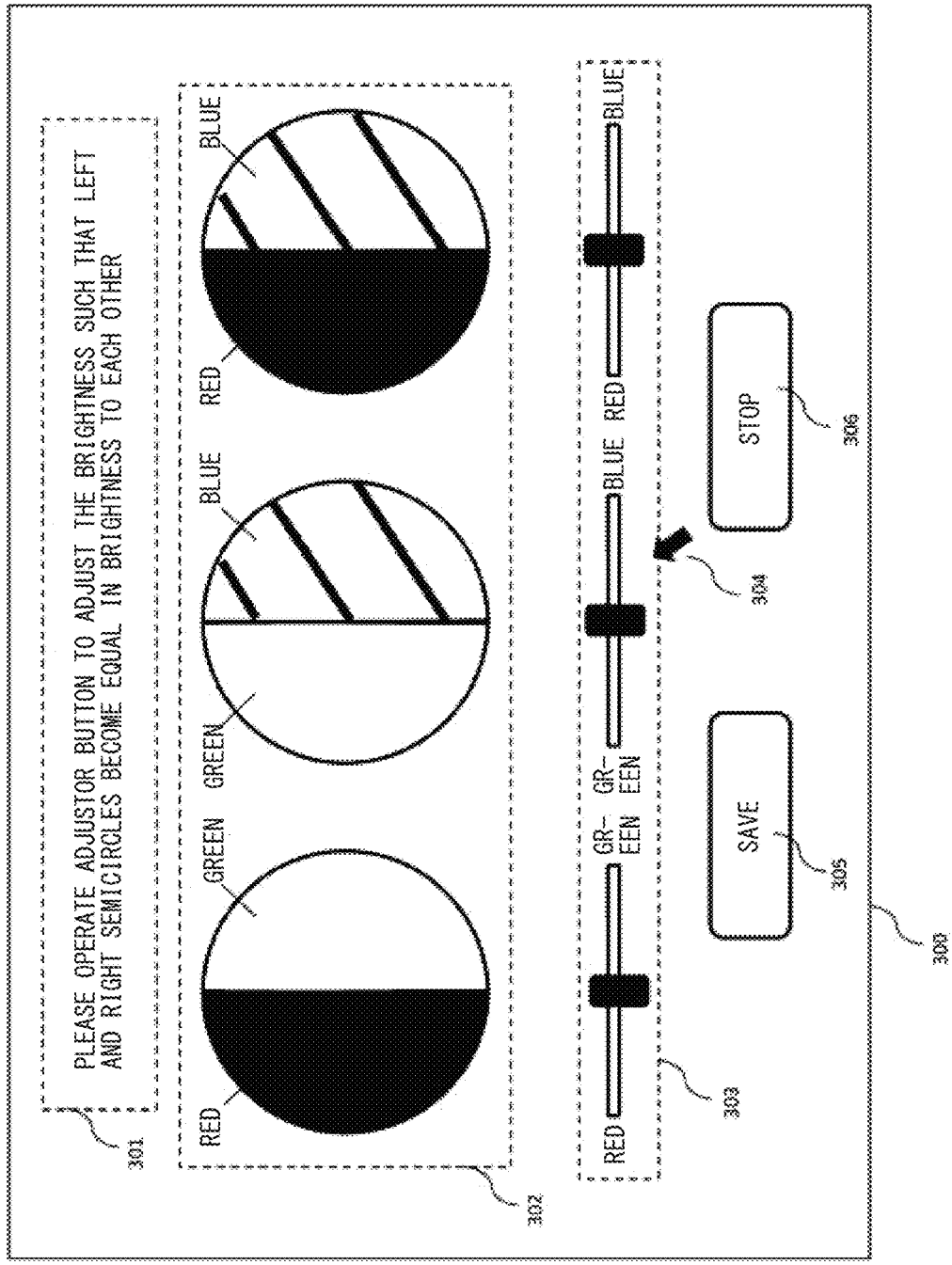
FIG. 12 is a diagram illustrating an example test screen used to obtain a color correction factor appropriate for the user.
Figure 13:
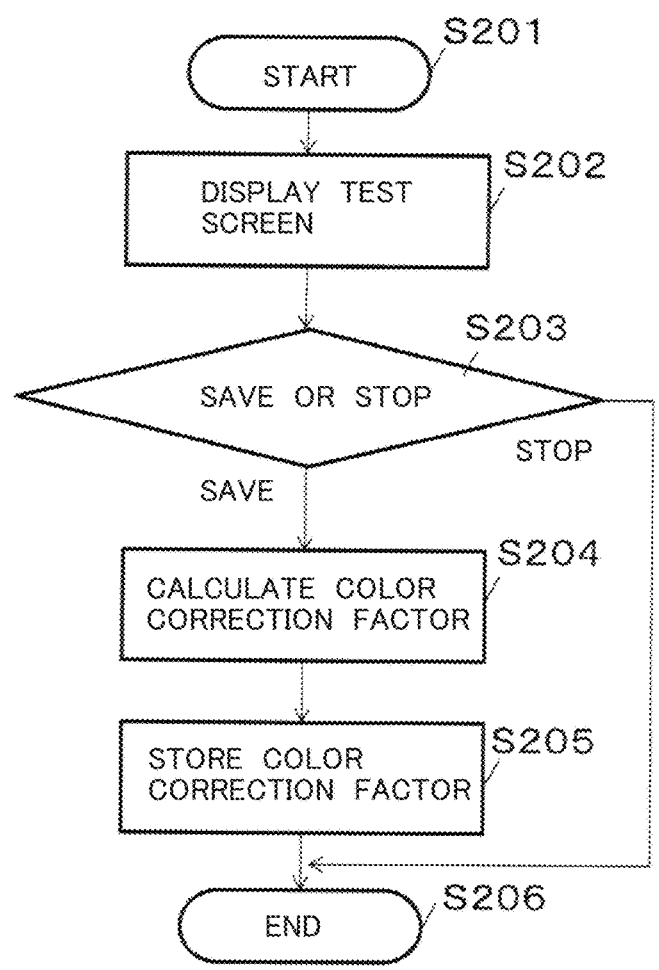
FIG. 13 is a flowchart of the operation of the head-mounted display when a color correction factor appropriate for the user is obtained.

The following description with reference to FIG. 11 to FIG. 13 is of a head-mounted display when a color correction factor appropriate for a user is acquired. FIG. 11 is a schematic diagram illustrating an example block diagram of the head-mounted display when a color correction factor appropriate for the user is obtained. FIG. 12 is a diagram illustrating an example test screen used to obtain a color correction factor appropriate for the user. FIG. 13 is a flowchart of the operation of the head-mounted display when a color correction factor appropriate for the user is obtained.

A head-mounted display 101a in FIG. 11 includes a color correction factor acquirer 214 in addition to the configuration of the head-mounted display 101 shown in FIG. 3. The color correction factor acquirer 214 is capable of obtaining a color correction factor appropriate for the user. Details of functional components similar to those in FIG. 3 are omitted.

Each of constituent components of the head-mounted display 101a for obtaining a color correction factor appropriate for the user will now be described in detail.

For acquiring a color correction factor of the user, the color correction factor acquirer 214 causes the picture display assembly 207 to display a test screen 300 as illustrated in FIG. 12, by way of example. However, if the color correction factor is set based on the color vision property, a manner may be used in which a selection is made from preset color vision properties, such as C-type color vision with normal visual sensitivities to all the red, green and blue color components, P-type color vision with a low visual sensitivity to the red color component, D-type color vision with a low visual sensitivity to the green color component, and the like.

The test screen 300 includes: a guide 301 that provides how to run the test; a color correction factor test chart 302 in which left and right semicircles are displayed, and each of semicircles is colored in red, green or blue; a brightness ratio adjuster feature 303 for adjustment of the brightness ratio of the color components contained in the left and right semicircles in the color correction factor test chart 302; a cursor which is an element of operating feature 304; a save button 305; and a stop button 306.

For example, pairs of left and right semicircles in the color correction factor test chart 302 are displayed respectively in a set of red and green colors, a set of green and blue colors and a set of blue and red colors. If the user operates the brightness ratio adjuster feature 303 by use of the operating feature 304, the ratio of brightness between the color components contained in the left and right semicircles can be changed. If the brightness ratio adjuster feature 303 is operated to a leftward position of the midpoint of the brightness ratio adjuster feature 303, the brightness of the color component in the left semicircle is reduced, while the brightness of the color component in the right semicircle is increased. If the brightness ratio adjuster feature 303 is operated to the midpoint of the brightness ratio adjuster feature 303, for a person having normal visual sensitivity, the color components contained in the left and right semicircles look the same brightness as each other.

In the setting of the color correction factor based on the color vision property, the brightness ratio adjuster feature 303 is operated such that the color components contained in the left and right semicircles in the color correction factor test chart 302 look the same brightness. In the setting of the color correction factor to suit preferences of the user, the brightness of the color components contained in the left and right semicircles in the color correction factor test chart 302 is adjusted to suit the preferences. After the adjustment is completed, a color correction factor is calculated from a ratio of brightness between the color components contained in the left and right semicircles of the color correction factor test chart 302. For example, in the setting of the color correction factor based on the color vision property, for a user having the same sensitivities to brightness of the green and blue color components but having a 50 percent lower sensitivity to brightness of the red components than the sensitivities to brightness of the green and blue color components, a ratio of brightness of the color components in the left and right semicircles in the color correction factor test chart 302 is 2 to 1, in which the red color is twice higher than the green or blue color. A normalized maximum value of the inverse of the ratio of brightness of the color components contained in the left and right semicircles in the color correction factor test chart 302 is defined as a color correction factor of each of the red, green and blue color components. However, in the case of using a plurality of the color correction factor test charts 302, the ratios of each of the red, green and blue color components are averaged and a normalized maximum value of the inverse of the averaged ratio is defined as a color correction factor of each of the red, green and blue color components. Using a plurality of color correction factor test charts 302 enables acquiring a color correction factor with higher accuracy. The acquired color correction factors are stored in the storage unit 202.

In this manner, the color correction factor acquirer 214 can be used to acquire a color correction factor changing depending on physical condition and advancing age at all times in an effortless and casual manner.

The following description with reference to FIG. 13 is the flow of the processing for acquiring the color correction factor using the color correction factor acquirer 214.

Upon the color correction factor acquirer 214 starting operation (S201), the color correction factor acquirer 214 causes the picture display assembly 207 to display the test screen (S202). The user inputs color correction factors through the brightness ratio adjuster feature 303 via the operating feature 304. The controller 201 determines whether or not the save button 305 or the stop button 306 is pressed. If the controller 201 determines that the stop button 306 has been pressed (S203/stop), a sequence of processing operations illustrated in FIG. 13 is terminated (S206). If the controller 201 determines that the test for a color correction factor has been carried out (S203/save), the color correction factor acquirer 214 calculates a color correction factor (S204) and then the color correction factor acquirer 214 saves the calculated color correction factor into the storage unit 202 (S205), followed by termination of the processing operations (S206).

The above has described how the color correction factor acquirer 214 acquires a color correction factor of the user on the basis of the user input action on the test screen 300, but the present invention is not limited to the above described method. The color correction factor acquirer 214 may be able to obtain information related to sensitivity to brightness of each of red, green and blue color components. For example, the color correction factor acquirer 214 may receive the sensitivity to brightness of each of red, green and blue color components as a test result, from a medical institution or the like through communication via the communicator 204.

Further, for the acquisition of the color correction factor of the user, the acquiring operation may be performed separately between bright environment around the user and dark environment around the user. Although especially not shown, the head-mounted display 101a may be equipped with a color correction factor auto-transfer switch, and the color correction factor in the bright environment and the color correction factor in the dark environment, which are stored in the storage unit 202, may be automatically used differently depending on brightness of the environment around the user. For example, if the brightness of the environment around the user exceeds a predetermined brightness, the color correction factor in the bright environment is used to generate a picture. Likewise, if the brightness of the environment around the user falls below a predetermined brightness, the color correction factor in the dark environment is used to generate a picture. This enables the color vision assistance with reference to a bright place and a dark place.

The following description is a method of implementing the operation of the head-mounted display with lower power consumption.

Figure 14:
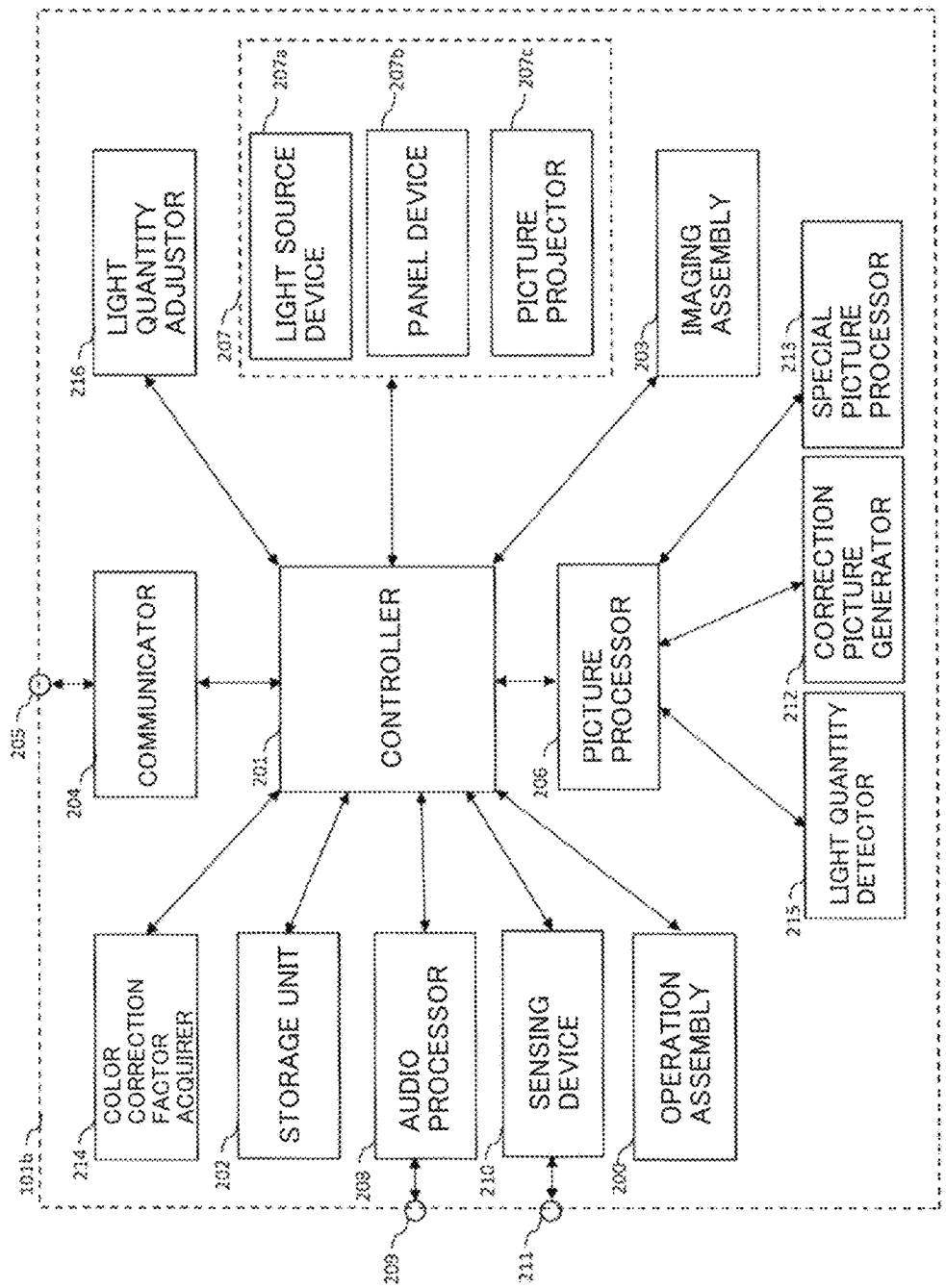
FIG. 14 is a schematic diagram illustrating an example block diagram of a head-mounted display offering perception of correct colors in a low power consumption manner.

The head-mounted display according to the present invention is for assisting the color vision of the user, and therefore of extreme importance is the ability to allow for the use and wearing for many hours. However, in a display that adjusts the brightness of each of the red, green and blue color components of a display picture by controlling the transmittance such as LCD (Liquid Crystal Display), for example, if the brightness of the display picture is half of the maximum brightness of the red, green and blue color components of a light source, 50% light is passed though and the remaining 50% is unnecessary light. Accordingly, if the brightness of the red, green and blue color components included in the display picture is darker than the maximum brightness of the light source, this is inefficient because light of all the red, green and blue color components of the light source is emitted at a maximum brightness at all times. The following description with reference to FIG. 14 is the configuration of a head-mounted display achieving the perception of correct colors in a low power consumption manner. FIG. 14 is a schematic diagram illustrating an example block diagram of the head-mounted display achieving perception of correct colors in a low power consumption manner.

A head-mounted display 101b illustrated in FIG. 14 includes a light quantity detector 215, and a light quantity adjuster 216 for adjusting the light quantity of each of the red, green and blue color components of the light source, in addition to the configuration of the head-mounted display 101a in FIG. 11. Further, the picture display assembly 207 is illustrated in FIG. 13 as including a light source device 207a, a panel device 207b and a picture projector 207c (corresponding to reference sign 105 in FIG. 1), but such internal configuration is included in the foregoing head-mounted display 101 (see FIG. 3), 101a (see FIG. 7) in FIG. 3, in which showing of the internal configuration is merely omitted. Details of part of the configuration of the head-mounted display 101b similar to that of the head-mounted display 101a are omitted.

Each constituent component of the head-mounted display 101b achieving perception of correct colors in a low power consumption manner will now be described in detail.

The light quantity detector 215 detects maximum brightness of the red, green and blue color components in a picture generated in the correction picture generator 212. The light quantity adjuster 216 turns on the red-color, green-color and blue-color light source devices 207a of the picture display assembly 207 according to brightness in which the red, green and blue color components detected by the light quantity detector 215 is maximized. This prevents the light source device 207a from illuminating unnecessary brightness when the picture is displayed. Accordingly, when the brightness included in the display picture is darker than the maximum brightness of the light source, the brightness of the light source is adjusted so as to be a maximum brightness of the display picture. By virtue of this configuration, a head-mounted display with reduced power consumption can be provided.

In the embodiment, further, the color components of the scenery and the picture are mixed for color perception. Because of this, the required brightness is lowered as compared with the case where the picture alone is used to perceive correct colors, enabling a further reduction in power consumption.

Incidentally, it is difficult to superimpose a picture on scenery in exact alignment with each other. If the picture and the scenery are offset, this causes uncomfortable feeling. To avoid this, correction processing for minimizing the uncomfortable feeling may be performed when the scenery and the picture are not exactly aligned and overlaid with each other.

Figure 15:
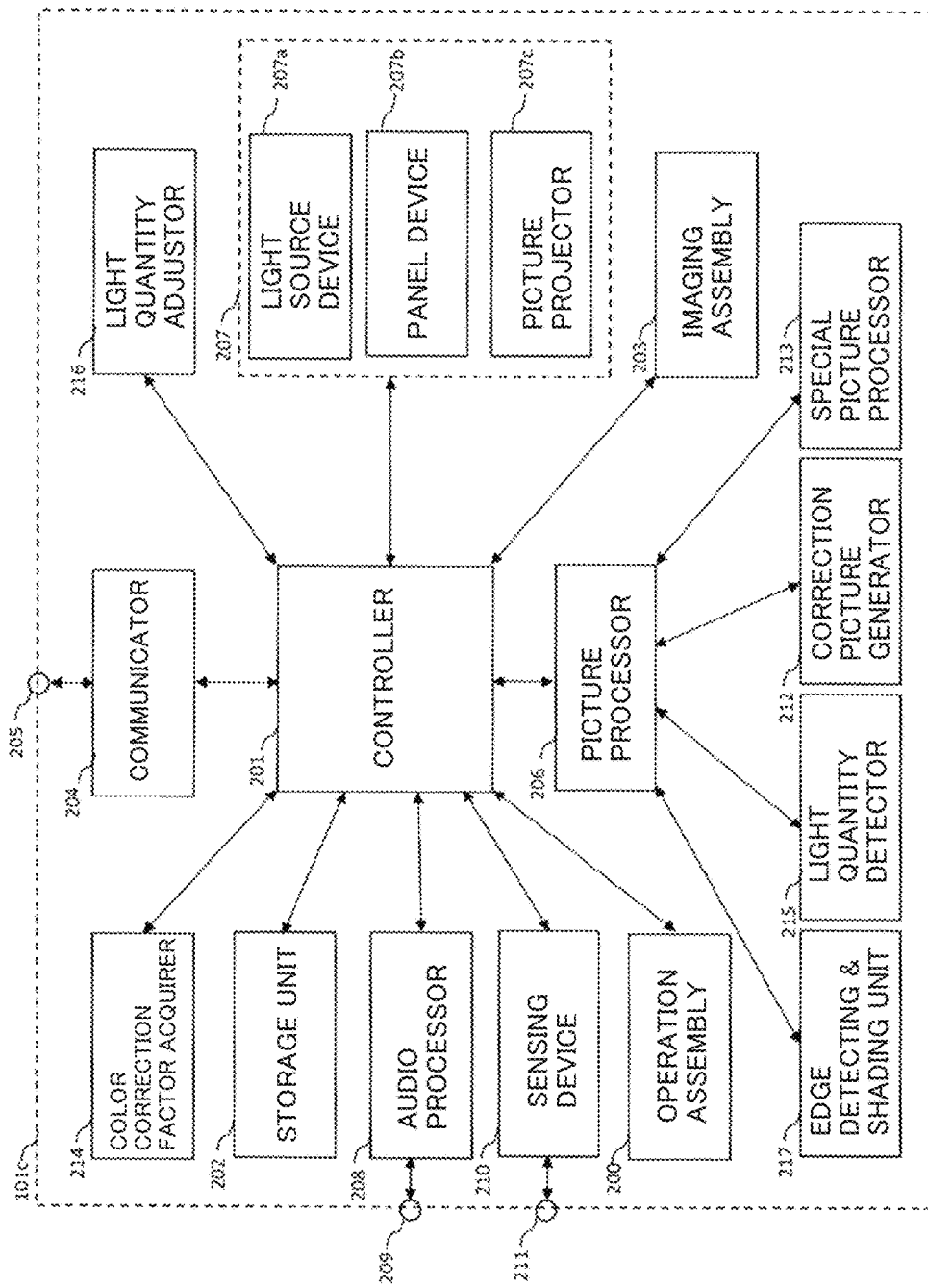
FIG. 15 is a schematic diagram illustrating an example block diagram of a head-mounted display that generates a correction picture for minimizing the uncomfortable feeling caused when scenery and a picture are not exactly aligned and overlaid.

FIG. 15 is a schematic diagram illustrating an example block diagram of the head-mounted display that generates a correction picture for minimizing the uncomfortable feeling caused when the scenery and the picture are not exactly aligned and overlaid.

A head-mounted display 101c illustrated in FIG. 15 includes an edge detecting and shading unit 217 in addition to the configuration of the head-mounted display 101b (see FIG. 14). Details of functional components similar to those in FIG. 14 are omitted.

Each constituent component of the head-mounted display 101c will now be described in detail.

The edge detecting and shading unit 217 initially performs edge detection on the picture generated by the correction picture generator 212. As a method of edge detection, for example, a color difference or a brightness difference of the color components included in each pixel of the picture can be used for detection. Subsequently, the processing to blur the detected edge portions is performed. For the shading processing, for example, the color components may be adjusted in such a manner as to effect a gradual reduction in a difference on the periphery of the edge portion in which a large color difference or a large brightness difference occurs. In this manner, pixels, in which a value of brightness or color component of each pixel forming the picture generated by the correction picture generator 212 changes abruptly as compared with the surrounding pixels, are detected as an edge and then the shading processing is performed on the periphery of the detected edge. This is able to allow the user to perceive colors of the scenery in a natural manner without uncomfortable feeling even if the picture and scenery are offset from each other.

According to the embodiment, a see-through head-mounted display is equipped with an imaging assembly. The color correction processing using a color correction factor of the user is performed on a source picture taken by the imaging assembly to generate a correction picture. An area of the correction picture corresponding to a picture display area in the source picture is trimmed (cut away) and displayed. As a result, because the user is able to see the scenery and the correction picture which are being overlaid on each other, the user can perceive correct colors while seeing directly the scenery. Further, it is an object to provide a safe picture display device without the user's visual field obstructed in the event a failure occurs in a head-mounted display by using the see-through head-mounted display.

Note that the steps of performing the color correction processing on the source image to generate a correction picture and then performing processing on an area of the correction picture corresponding to a picture display area in the source picture have been described, but a processing order is not limited to this. For example, an area of the source picture corresponding to the picture display area may be trimmed first, and then the color correction processing may be performed on the trimmed picture (a partial area of the source picture) to generate a correction picture.

Second Embodiment

A second embodiment is an embodiment in which the correction picture generator 212 and the special picture processor 213 described in the first embodiment are applied to a head-up display.

A head-up display is a picture display device that projects a picture mainly on a windshield of a vehicle. Thus, a driver is able to acquire a travel speed, map information and/or the like while being looking scenery ahead.

Figure 16:
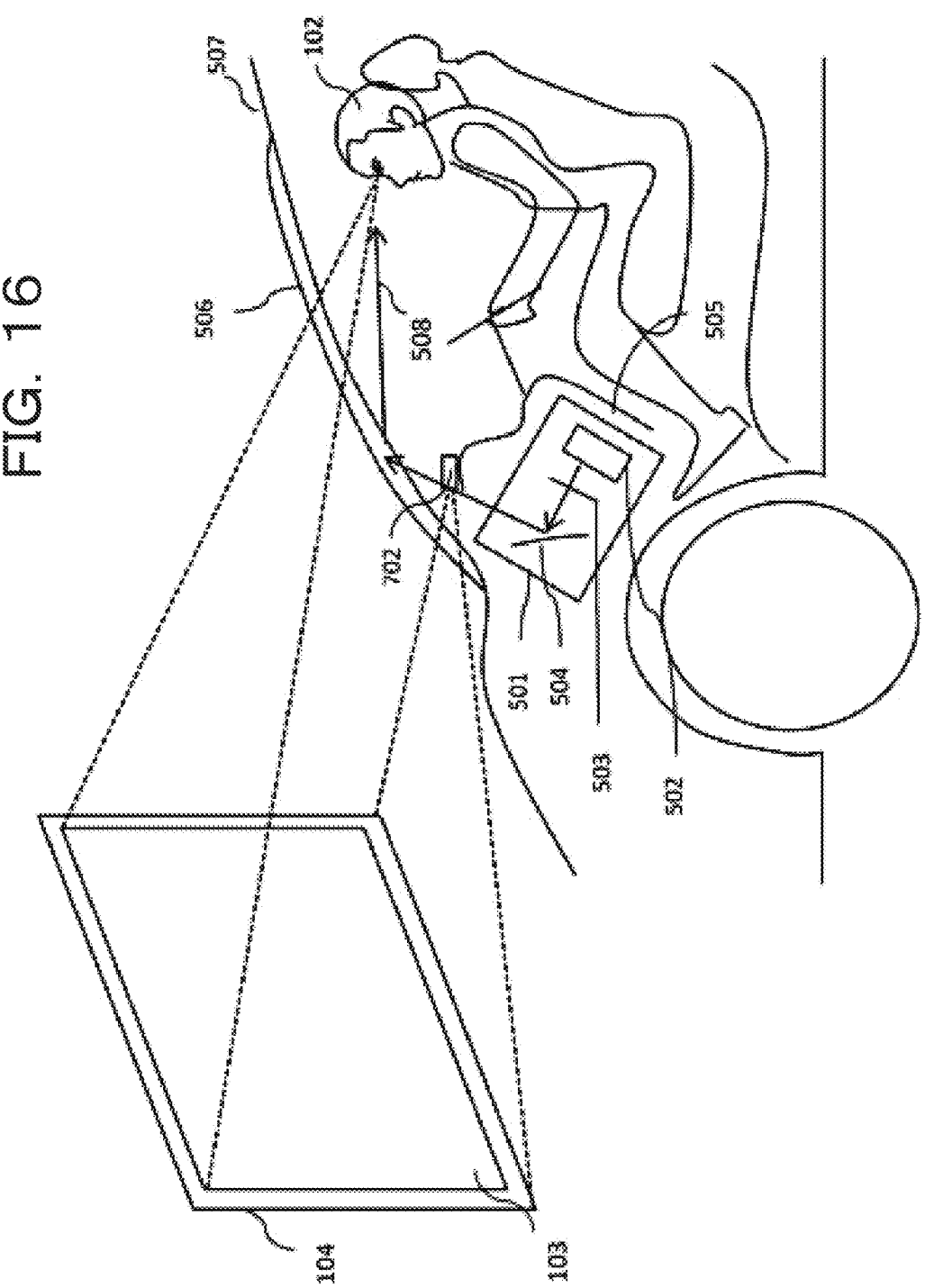
FIG. 16 is a schematic diagram illustrating an example aspect of a head-up display according to a second embodiment.

An overview of a head-up display according to the embodiment will be described below. FIG. 16 is a schematic diagram illustrating an example aspect of the head-up display according to the second embodiment.

As illustrated in FIG. 16, a head-up display 501 is placed within a dashboard 505 of a vehicle 507, by way of example. The head-up display 501 incorporates a projector 502, a screen 503 on which a picture is projected from the projector 502 and a mirror 504. A video light 508 emitted from the head-up display 501 is reflected on a reflection surface 506 of the windshield to reach the eyes of the driver. The driver perceives the video light 508 generated on the screen 503 in the head-up display 501, as a picture located forward of the reflection surface 506. The picture is displayed in a picture display area 103. In addition, the vehicle 507 is equipped with a vehicle-mounted camera 702 to take a picture of a partial field or the full field of vision of the driver. The vehicle-mounted camera 702 images an area 104 in the field of vision of the driver.

The following description is the configuration in which the correction picture generator 212 and the special picture processor 213 in the first embodiment are applied to the head-up display 501 mounted on the vehicle.

Figure 17:
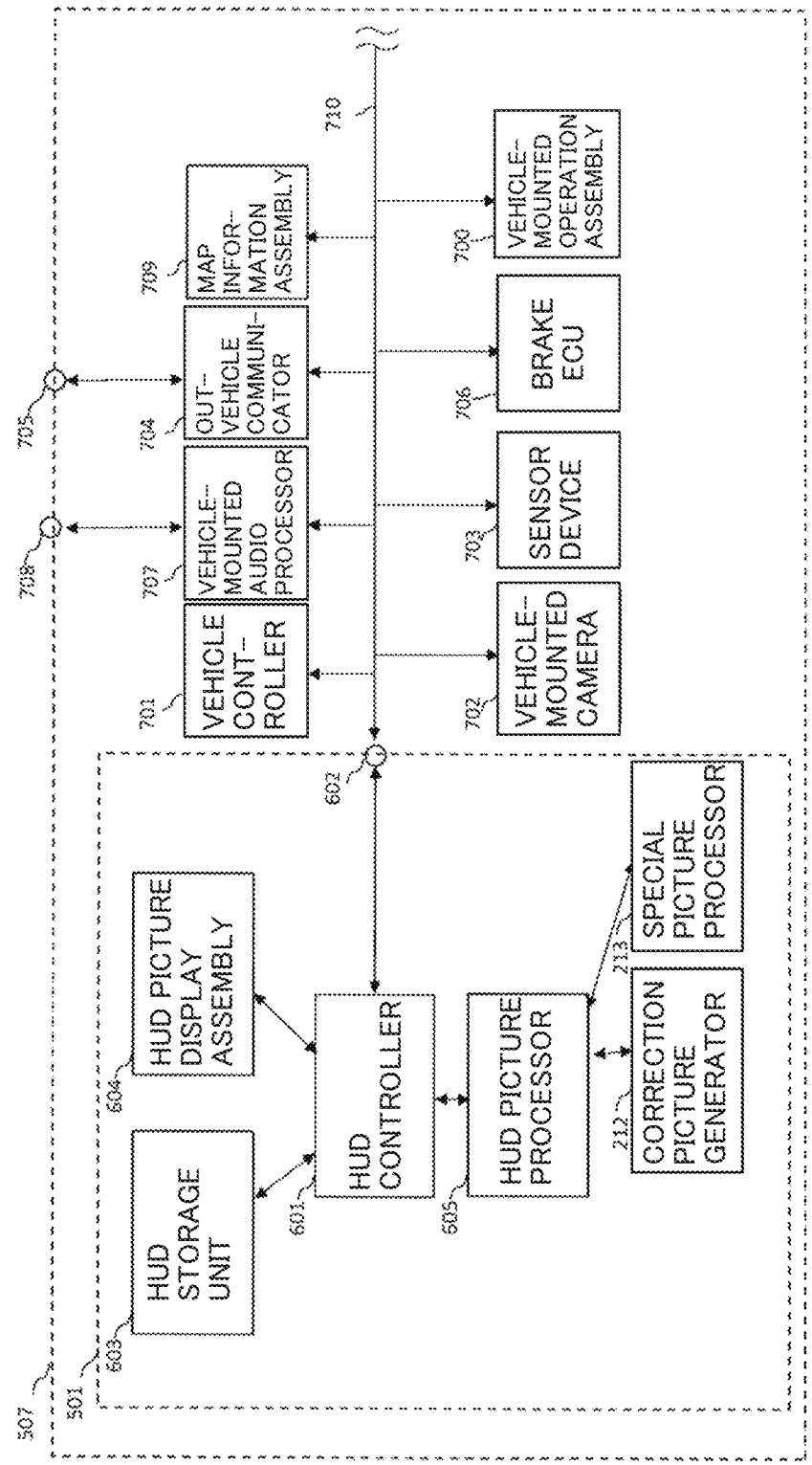
FIG. 17 is a schematic diagram illustrating an example block diagram of the head-up display mounted on a vehicle.

FIG. 17 is a schematic diagram illustrating an example block diagram of the head-up display mounted on the vehicle. The head-up display 501 includes a HUD (Head-Up Display) controller 601 that controls the entire head-up display 501, an in-vehicle communication input/output assembly 602 capable of allowing the sharing of information between the head-up display 501 and the vehicle 507, a HUD storage unit 603, a HUD picture display assembly 604, a HUD picture processor 605, the correction picture generator 212 and the special picture processor 213. The HUD controller 601 is connected individually to the in-vehicle communication input/output assembly 602, the HUD storage unit 603, the HUD picture display assembly 604 and the HUD picture processor 605. In turn, the HUD picture processor 605 is connected individually to the correction picture generator 212 and the special picture processor 213.

The vehicle 507 is equipped with a vehicle-mounted operation assembly 700, a vehicle controller 701 that controls the entire vehicle, the vehicle-mounted camera 702, a sensor device 703, an out-vehicle communicator 704, a brake ECU (Engine Control Unit) 706, a vehicle-mounted audio processor 707 corresponding to a microphone or earphones, and a map information assembly 709, all of which are interconnected via a bus 710. In turn, the out-vehicle communicator 704 is connected to an out-vehicle communication input/output assembly 705 through which the vehicle controller 701 controls communication with an external communication device. Further, the vehicle-mounted audio processor 707 is connected to a vehicle-mounted audio input/output assembly 708 so that the vehicle controller 701 controls audio input/output. The bus 710 is connected to the in-vehicle communication input/output assembly 602. Thus, the head-up display 501 is connected to each constituent component mounted in the vehicle 507, through the in-vehicle communication input/output assembly 602.

The HUD controller 601 in the head-up display 501 corresponds to the controller 201 of the head-mounted display in the first embodiment. Similarly, the in-vehicle communication input/output assembly 602 corresponds to the communicator 204, the HUD storage unit 603 to the storage unit 202, the HUD picture display assembly 604 to the picture display assembly 207, and the HUD picture processor 605 corresponds to the picture processor 206, and similar functions are implemented.

Accordingly, the HUD storage unit 603 has color correction factors stored therein for correcting the brightness of each of the red, green and blue color components of a picture. Incidentally, the correction picture generator 212 and the special picture processor 213 have the same configuration as the first embodiment.

The brake ECU 706 is a unit controlling the entire vehicle brake function.

The map information assembly 709 has map information stored therein such as road information, facility information, traffic signal information, traffic sign information and the like. The map information in the map information assembly 709 may be updated to the latest information through communication with the exterior via the out-vehicle communicator 704.

The vehicle-mounted operation assembly 700 is an operation member for the user to input instructions to each configuration mounted on the vehicle 507. The sensor device 703 will be described blow.

Figure 18:
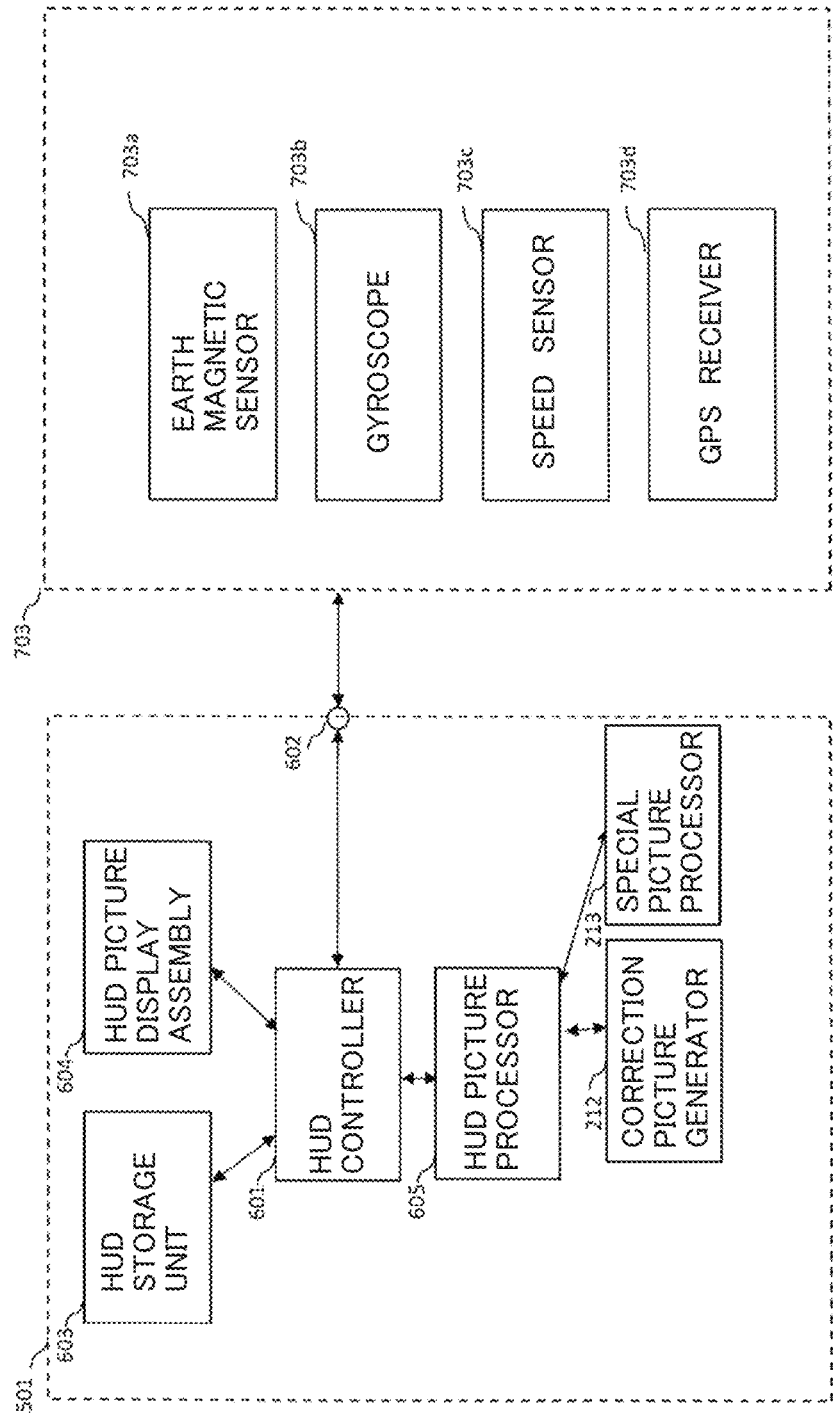
FIG. 18 is a schematic diagram illustrating an example block diagram of a sensor device.

FIG. 18 is a schematic diagram illustrating an example block diagram of the sensor device 703. The sensor device 703 includes: an earth magnetic sensor 703a for detection of an orientation of the vehicle 507; a gyroscope 703b for detection of an angle or an angular velocity of the vehicle; a speed sensor 703c for detection of a vehicle; and a GPS receiver 703d for a global positioning system (GPS) to measure a geographical vehicle position based on radio waves from a satellite. Because these sensors have individually errors of different nature, a plurality of the sensors and the like are configured to be used while being mutually complemented. Note that, depending on precision, a sensor device may be configured by using part of the sensor device 703.

Also, the sensor device 703 determines a vehicle position based on signals detected by the sensor and/or the like. Also, based on the determined vehicle position, after which the sensor device 703 reads a piece of map information on an area around the vehicle position from the map information in the map information assembly 709. Subsequently, the sensor device 703 performs comparisons between the vehicle position and the area information including the road information, facility information, traffic signal information and the traffic sign information of the map information, in order to determine what road or facility on the map information the vehicle is located in, and/or determine where traffic signals and/or traffic signs are located. The sensor device 703 extracts map information corresponding to own vehicle position for transmission to the head-up display 501. The head-up display 501 projects the received map information toward the windshield. Alternatively, the HUD picture processor 605 may extract the traffic sign information and traffic signal information from the map information, and then may perform color correction on the information for display as a virtual image.

Further, the sensor device 703 performs comparison between geometry of a vehicle travel trajectory and road geometries around the vehicle position, and the sensor device 703 determines a road having the highest correlation with the vehicle travel trajectory as a road on which the vehicle is traveling. Thereby, a correction for the vehicle position determined based on the signal from the sensor device 703 is made.

Further, the light quantity detector 215, light quantity adjuster 216, edge detecting and shading unit 217 and/or the like may be applied to the head-up display 501. This enables acquiring a color correction factor appropriate for a driver, reducing the power consumption of the head-up display 501, and minimizing the uncomfortable feeling caused when scenery and a picture are not exactly aligned and overlaid.

The following describes advantageous effects produced when the correction picture generator 212 and the special picture processor 213 described in the first embodiment are applied to the head-up display 501 mounted on the vehicle.

The scenery which the driver is seeing through the windshield may conceivably include a traffic signal, a traffic sign, a lit brake light of another vehicle ahead, and/or the like. Because those colors have significance, it is very important that the driver is able to conceive the correct colors while seeing directly the scenery. For example, if the driver has low sensitivity to red color, the brightness of the red color component of the traffic signal and/or the traffic sign is reduced to appear as a dark brown color. Because of this, the red color may possibly not be conceived as an alert color to cause the traffic signal and/or sign to be late in being acknowledged. Further, it is conceivable that such a driver will possibly cause an accident because he/she is not able to conceive the color of the traffic signal, as a result of which the driver is forced to tense up at all time while driving.

Applying the correction picture generator 212 and the special picture processor 213 in the first embodiment to the head-up display 501 allows the driver to be able to perceive correct colors while seeing directly the scenery as described in the first embodiment. Thus, the colors of the traffic signals, the traffic signs and the like are correctly conceivable, achieving further improved safety and comfort.

In addition, the sensor device 703 may detect a position of a traffic signal and/or a traffic sign around the vehicle and the brightness of the color components thereof may be further amplified. Thus, even in a situation in which the color of the traffic signal and/or traffic sign is hard to be seen by blending with the surroundings, the color is clearly conceivable, achieving further improved safety and comfort.

The picture of the head-up display 501 is displayed at eye level in a forward position. The driver needs watch the traffic signals ahead as well as the nearby instruments, so that the eye position is changed on a continuous basis. In addition, the eye position is changed by a seat position, driver's posture and the like. Accordingly, the displayed position of the picture is misaligned with a change in eye position.

Figure 19:
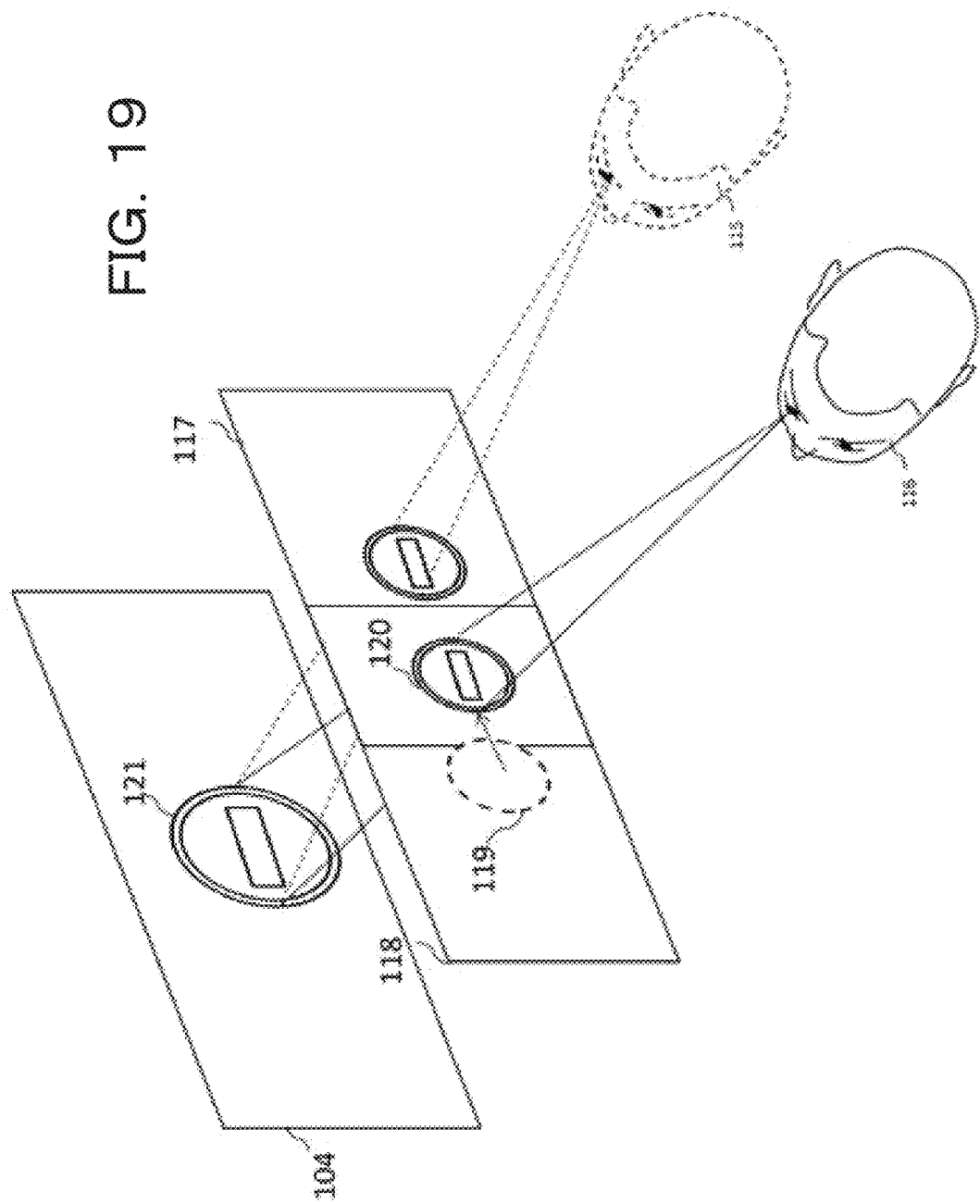
FIG. 19 is a schematic diagram illustrating an example set of scenery and a picture which are seen by a driver when the eye position is changed.

FIG. 19 is a schematic diagram illustrating an example set of scenery and a picture which are seen by the driver when the eye position is changed.

Reference sign 104 indicates an imaged area. Reference sign 115 indicates the driver before the eye position is changed. Reference sign 116 indicates the driver after the eye position is changed. Reference sign 117 indicates a picture display area for the driver 115 before the eye position is changed. Reference sign 118 indicates a picture display area for the driver 116 after the eye position is changed. Reference sign 119 indicates a picture non-aligned with the eye position. Reference sign 120 indicates a picture aligned with the eye position. Reference sign 121 indicates the scenery in the imaged area. Reference sign 122 indicates a picture seen by the driver with the eye position being non-shifted.

If the position of the driver's eye is changed from reference sign 115 to reference sign 116, the picture display area is shifted from reference sign 117 to reference sign 118. Because of this, the picture 119 in the picture display area is not aligned with the scenery 121 in the imaged area, so that the driver is not able to perceive the correct colors. To address this, there is need for display of the picture 120 according to solid lines of FIG. 19 in order for the driver to perceive the correct colors.

Figure 20:
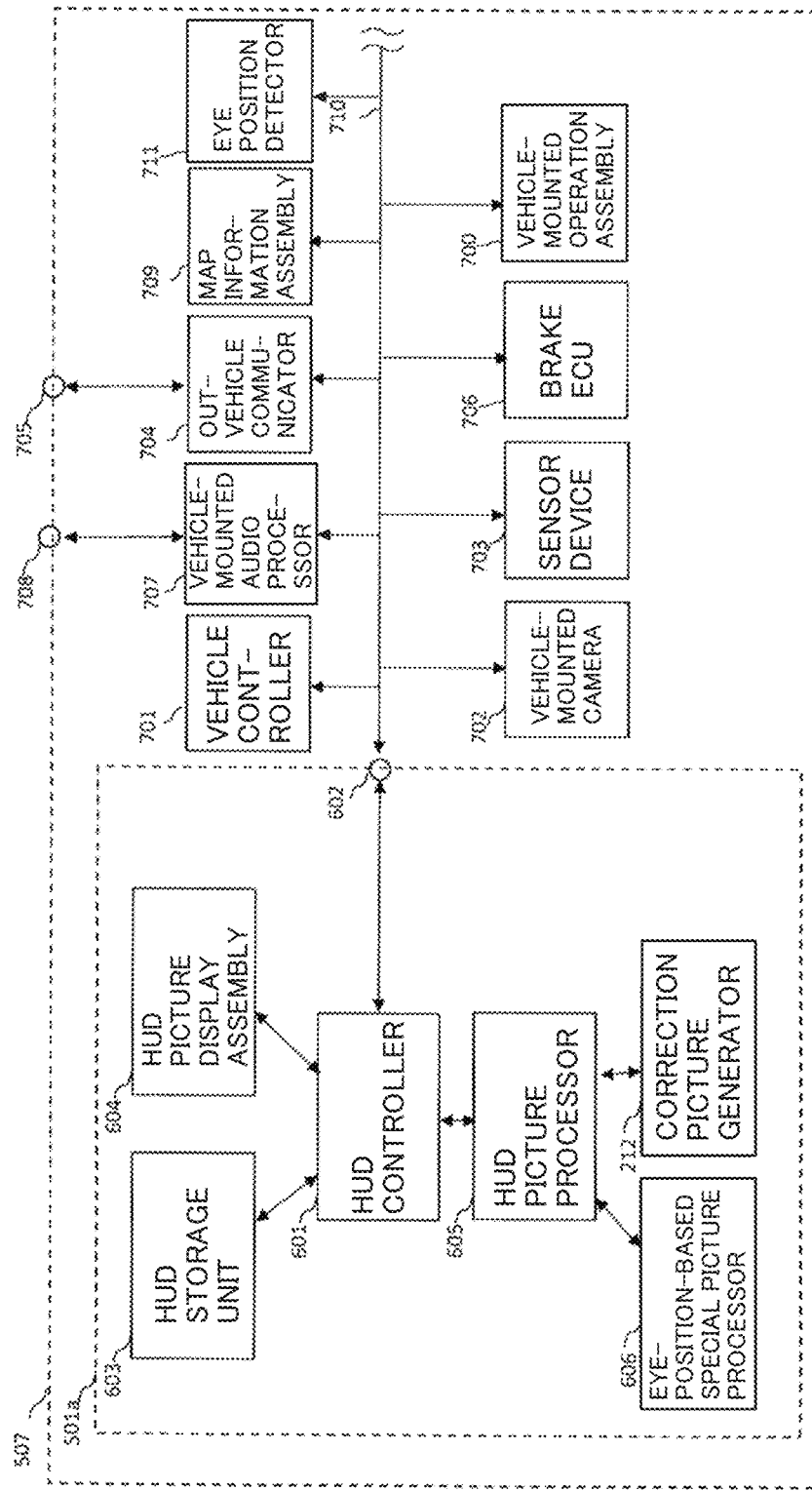
FIG. 20 is a schematic diagram illustrating an example block diagram of the head-up display capable of overlaying scenery and a picture on each other even when the eye position is changed so that a driver is able to perceive the correct colors while seeing directly the scenery.

FIG. 20 is a schematic diagram illustrating an example block diagram of the head-up display capable of overlaying scenery and a picture on each other even when the eye position is changed so that the driver is able to perceive the correct colors while seeing directly the scenery.

A head-up display 501a illustrated in FIG. 20 is different in including an eye-position-based special picture processor 606 instead of the special picture processor 213 of the head-up display 501. The eye-position-based special picture processor 606 is provided for changing the display position of a correction picture to follow the movement of the position of the driver's eye in order to overlay the correction picture on the scenery, which corresponds to an aspect of the special picture processor 213. The vehicle 507 also includes an eye position detector 711 connected to the bus 710. Other functional components are similar to those of the head-up display 501 shown in FIG. 17, and therefore details thereof are omitted.

Figure 21:
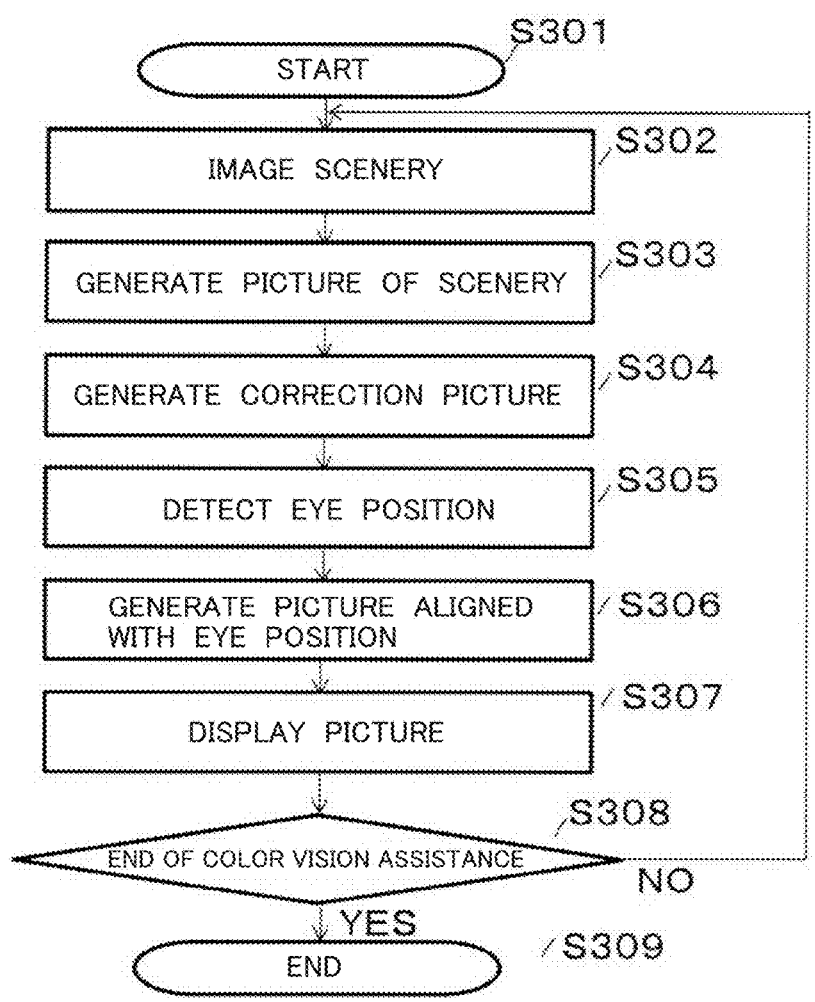
FIG. 21 is a schematic diagram showing a flowchart of the operation of the head-up display.

The function of each constituent component of the head-up display 501a will be described below pursuant to the flow of the operation. FIG. 21 is a schematic diagram showing a flowchart of the operation of the head-up display 501a.

Upon the head-up display 501a starting operation (S301), initially, the vehicle-mounted camera 702 images scenery (S302). The HUD picture processor 605 generates a picture imaged by the vehicle-mounted camera 702 (S303).

The correction picture generator 212 generates a correction picture by correcting and enhancing a color component with a low color correction factor of the color correction factors stored in the HUD storage unit 603, of the red, green and blue color components included in the picture generated by the HUD picture processor 605 (S304).

Then, the eye position detector 711 detects an eye position (S305).

The eye-position-based special picture processor 606 calculates the amount of misalignment of the position of the driver's eye from the eye position detected by the eye position detector 711, and then performs picture processing based on the amount of misalignment (S306). More specifically, a picture is displayed on the line of sight of the driver seeing the scenery, based on the distance from the center of the imaged area 104 to the eye in the depth direction and the in-plane direction, and the distance from the center of the picture display area to the eye in the depth direction and the in-plane direction. Thus, a picture is generated corresponding to the eye position.

Subsequently, the head-up display 501a displays the picture generated by the eye-position-based special picture processor 606 on the HUD picture display assembly 604 (S307). If the color vision assistance is ended (S308/Yes), the operation is ended (S309). If the color vision assistance is continued (S308/No), the flow returns to S302 to continue the operation.

In this manner, the scenery and the picture are overlaid on each other even if the eye position is misaligned, as a result of which the driver is able to perceive the correct colors while seeing directly the scenery.

According to the second embodiment, the HUD picture display assembly is used to display a picture of which the brightness is enhanced to augment a color component of the red, green and blue color components of the picture taken by the vehicle-mounted camera, the color component having a low color correction factor of the color correction factors stored in the HUD storage unit. This enables enhancement in brightness of color components included in a predetermined object such as a traffic signal, a traffic sign/mark, and/or the like. As a result, the driver is able to conceive the correct colors while seeing directly the scenery, achieving further improved safe and comfortable driving.

Further, by changing the picture trimming position in response to a change of the eye position, even when the eye position is changed, the amount of misalignment from the scenery can be further reduced, enabling display of the color corrected picture overlaid on the scenery.

There are modified forms of the head-up display according to the second embodiment as in the case of the head-mounted display according to the first embodiment. For example, a color correction factor acquirer similar to that in the first embodiment may be further included to acquire color correction factors by prompting the driver to enter color correction factors. Alternatively/additionally, a light quantity detector and a light quantity adjuster similar to those in the first embodiment may be included for a reduction in power consumption. Furthermore, alternatively/additionally, an edge detecting and shading unit similar to that in the first embodiment may be included. Further, because the correction picture generator in the second embodiment performs similar functions as the correction picture generator in the first embodiment, all the modified forms for the correction picture generator described in the first embodiment are just as valid for the correction picture generator in the second embodiment.

LIST OF REFERENCE SIGNS

101 Head-mounted display
102 User

103 Picture display area
104 Imaged area
105 Picture projector
106 Scenery in imaged area
107 Picture in picture display area
108 Brightness of actual color components of scenery
109 Brightness of color components perceived by user
110 Brightness of each color component of correction picture
111 Brightness of each color component of correction picture perceived by user
112 Brightness of each color component of color mixtures of correction picture and scenery perceived by user
115 Driver before eye position is changed
116 Driver after eye position is changed
117 Picture display area for driver before eye position is changed
118 Picture display area for driver 116 after eye position is changed
119 Picture non-aligned to the eye position
120 Picture aligned to the eye position
121 Scenery in imaged area
122 Picture seen by driver with the eye position being non-shifted
200 Operation assembly
201 Controller
202 Storage unit
203 Imaging assembly
204 Communicator
205 Communication input/output assembly
206 Picture processor
207 Picture display assembly
207a Light source device
207b Panel device
207c Picture projector
208 Audio Processor
209 Audio input/output assembly
210 Sensing device
211 Sensor input/output assembly
212 Correction picture generator
213 Special picture processor
214 Color correction factor acquirer
215 Light quantity detector
216 Light quantity adjuster
217 Edge detecting and shading unit
301 Guide providing test method
302 Color correction factor test chart displaying red, green or blue color in each of left and right semicircles
303 Brightness ratio adjustor feature
304 Operating feature
305 Save button
306 Stop button
401 Base station
402 Internet
501 Head-up display
502 Projector
503 Screen
504 Mirror
505 Dashboard
506 Windshield
507 Vehicle
508 Video light
601 HUD controller
602 In-vehicle communication input/output assembly
603 HUD storage unit
604 HUD picture display assembly
605 HUD picture processor
606 Eye-position-based special picture processor
700 Vehicle-mounted operation assembly
701 Vehicle controller
702 Vehicle-mounted camera
703 Sensor device
703a Earth magnetic sensor
703b Gyroscope
703c Speed sensor
703d GPS
704 Out-vehicle communicator
705 Out-vehicle communication input/output assembly
706 Brake ECU
707 Vehicle-mounted audio processor
708 Vehicle-mounted audio input/output assembly
709 Map information assembly
710 Eye position detector

The invention claimed is:

1. A head-mounted display, comprising:
an imaging assembly that images scenery which is being seen by a user;
a storage that stores color correction factors used for correcting brightness of each color component of a red color component, a green color component and a blue color component included in a source picture imaged by the imaging assembly;
a correction picture generation processor that performs color correction processing for enhancing a color component with a relatively low color correction factor of the color correction factors stored in the storage unit, on the red color component, green color component and blue color component forming the source picture, to generate a correction picture;
a picture display assembly that displays the correction picture in the field of view of the user under a condition where the user is able to perceive an outside world; and
a special picture processor that performs picture processing for overlaying the correction picture and the source picture on each other for display,
wherein the picture display assembly displays, as a color component with a highest brightness, a color component with a lowest color correction factor of the color correction factors, among the red color component, green color component and blue color component in the source picture,
wherein the color correction factors are color vision property information representing visual sensitivity of the user to each color of the red, green and blue colors, and
wherein the lowest color correction factor among the color correction factors is the color correction factor of the color with the lowest visual sensitivity of the user.

2. A head-mounted display, comprising:
an imaging assembly that images scenery which is being seen by a user;
a storage that stores color correction factors used for correcting brightness of each color component of a red color component, a green color component and a blue color component included in a source picture imaged by the imaging assembly;
a correction picture generation processor that performs color correction processing for enhancing a color component with a relatively low color correction factor of the color correction factors stored in the storage unit, on the red color component, green color component and blue color component forming the source picture, to generate a correction picture;

a picture display assembly that displays the correction picture in the field of view of the user under a condition where the user is able to perceive an outside world; and a special picture processor that performs picture processing for overlaying the correction picture and the source picture on each other for display, wherein the correction picture generation processor defines, as a reference color correction factor, a highest color correction factor of the color correction factors of the red color component, green color component and blue color component stored in the storage, and the correction picture generation processor generates the correction picture made darker than the source picture, for a color component with a color correction factor higher than one-half of the reference color correction factor, and generates the correction picture made brighter than the source picture, for a color component with a color correction factor no higher than one-half of the reference color correction factor.

3. A head-mounted display, comprising:

an imaging assembly that images scenery which is being seen by a user;

a storage that stores color correction factors used for correcting brightness of each color component of a red color component, a green color component and a blue color component included in a source picture imaged by the imaging assembly;

a correction picture generation processor that performs color correction processing for enhancing a color component with a relatively low color correction factor of the color correction factors stored in the storage unit, on the red color component, green color component and blue color component forming the source picture, to generate a correction picture;

a picture display assembly that displays the correction picture in the field of view of the user under a condition where the user is able to perceive an outside world; and a special picture processor that performs picture processing for overlaying the correction picture and the source picture on each other for display, wherein the correction picture generation processor generates the correction picture to satisfy the following equations:

$$R(\text{correction})=R(\text{red})\times(1-\alpha(\text{red}))/\alpha(\text{red})$$

$$G(\text{correction})=G(\text{green})\times(1-\alpha(\text{green}))/\alpha(\text{green})$$

$$B(\text{correction})=B(\text{blue})\times(1-\alpha(\text{blue}))/\alpha(\text{blue})$$

where $\alpha(\text{red})$, $\alpha(\text{green})$ and $\alpha(\text{blue})$ are color correction factors for correction of brightness of each of the red color component, green color component and blue color component in a picture stored in the storage, $R(\text{red})$, $G(\text{green})$ and $B(\text{blue})$ are brightnesses of each of the red color component, green color component and blue color component of the source picture, and $R(\text{correction})$, $G(\text{correction})$ and $B(\text{correction})$ are brightnesses of each of the red color component, green color component and blue color component of the correction picture.

4. A head-mounted display, comprising:

an imaging assembly that images scenery which is being seen by a user;

a storage that stores color correction factors used for correcting brightness of each color component of a red color component, a green color component and a blue color component included in a source picture imaged by the imaging assembly;

a correction picture generation processor that performs color correction processing for enhancing a color component with a relatively low color correction factor of the color correction factors stored in the storage unit, on the red color component, green color component and blue color component forming the source picture, to generate a correction picture;

a picture display assembly that displays the correction picture in the field of view of the user under a condition where the user is able to perceive an outside world; and a special picture processor that performs picture processing for overlaying the correction picture and the source picture on each other for display, wherein the head-mounted display further has a color correction factor receiver that accepts inputs from the user in order to acquire color correction factors for correcting brightness of each of the red color component, green color component and blue color component of a picture, and the color correction factor receiver causes the picture display assembly to display a test screen that includes: a red display region for display of red color; a green display region for display of green color; a blue display region for display of blue color; and an adjuster feature for adjustment of a ratio of brightness respective in the red display region, green display region and blue display region, and acquires a color correction factor of each of the red color component, green color component and blue color component of a picture on the basis of instructions input by the user through the adjuster feature.

5. The head-mounted display according to claim 1, further comprising:

a light sensor that detects brightness of a pixel in which each of the red color component, green color component and blue color component is maximized, among pixels forming the picture generated by the correction picture generation processor; and a light quantity adjustment processor that turns on a light source device for each of red, green and blue colors of the picture display assembly according to the brightness detected by the light sensor of which each of the red color component, green color component and blue color component is maximized.

6. The head-mounted display according to claim 1, further comprising an edge detecting and shading processor that detects, as an edge, pixels in which values of brightness and color component of each pixel forming the picture generated by the correction picture generation processor change abruptly as compared with surrounding pixels, and performs shading processing to blur a periphery of the detected edge.

7. A head-mounted display, comprising:

an imaging assembly that images scenery which is being seen by a user;

a storage that stores color correction factors used for correcting brightness of each color component of a red color component, a green color component and a blue color component included in a source picture imaged by the imaging assembly;

a correction picture generation processor that performs color correction processing for enhancing a color component with a relatively low color correction factor of the color correction factors stored in the storage unit, on the red color component, green color component and blue color component forming the source picture, to generate a correction picture;

a picture display assembly that displays the correction picture in the field of view of the user under a condition where the user is able to perceive an outside world;

a special picture processor that performs picture processing for overlaying the correction picture and the source picture on each other for display;

a line-of-sight detector that detects a line of sight of the user; and a picture range limiter that limits a generation range of the source picture exclusively to a range corresponding to an area in the vicinity of the line of sight detected by the line-of-sight detector.

8. A head-up display, comprising:

a HUD storage that stores color correction factors used for correcting brightness of each color component of a red color component, a green color component and a blue color component included in a picture;

a correction picture generation processor that obtains a source picture imaged by a vehicle-mounted camera from the vehicle-mounted camera which is mounted on a vehicle with a driver aboard to image scenery seen by the driver, and performs color correction processing to generate a correction picture, the color correction processing being performed for enhancing a color component with a relatively low color correction factor of the color correction factors stored in the storage, among the red color component, green color component and blue color component forming the source picture;

a HUD picture display assembly that displays the correction picture in the field of view of the driver under a condition where the driver is able to perceive an outside world; and a special picture processor that performs picture processing for overlaying the correction picture and the source picture on each other for display, wherein the picture display assembly displays, as a color component with a highest brightness, a color component with a lowest color correction factor of the color correction factors, among the red color component, green color component and blue color component in the source picture, wherein the color correction factors are color vision property information representing visual sensitivity of the driver to each color of the red, green and blue colors, and wherein the lowest color correction factor among the color correction factors is the color correction factor of the color with the lowest visual sensitivity of the user.

9. A head-up display, comprising:

a HUD storage that stores color correction factors used for correcting brightness of each color component of a red color component, a green color component and a blue color component included in a picture;

a correction picture generation processor that obtains a source picture imaged by a vehicle-mounted camera from the vehicle-mounted camera which is mounted on a vehicle with a driver aboard to image scenery seen by the driver, and performs color correction processing to generate a correction picture, the color correction processing being performed for enhancing a color component with a relatively low color correction factor of the color correction factors stored in the storage, among the red color component, green color component and blue color component forming the source picture;

a HUD picture display assembly that displays the correction picture in the field of view of the driver under a condition where the driver is able to perceive an outside world; and a special picture processor that performs picture processing for overlaying the correction picture and the source picture on each other for display, wherein the correction picture generation processor defines, as a reference color correction factor, a highest color correction factor of the color correction factors of the red color component, green color component and blue color component stored in the storage, and the correction picture generation processor generates the correction picture made darker than the source picture, for a color component with a color correction factor higher than one-half of the reference color correction factor, and generates the correction picture made brighter than the source picture, for a color component with a color correction factor no higher than one-half of the reference color correction factor.

10. A head-up display, comprising:

a HUD storage that stores color correction factors used for correcting brightness of each color component of a red color component, a green color component and a blue color component included in a picture;

a correction picture generation processor that obtains a source picture imaged by a vehicle-mounted camera from the vehicle-mounted camera which is mounted on a vehicle with a driver aboard to image scenery seen by the driver, and performs color correction processing to generate a correction picture, the color correction processing being performed for enhancing a color component with a relatively low color correction factor of the color correction factors stored in the storage, among the red color component, green color component and blue color component forming the source picture;

a HUD picture display assembly that displays the correction picture in the field of view of the driver under a condition where the driver is able to perceive an outside world; and a special picture processor that performs picture processing for overlaying the correction picture and the source picture on each other for display, wherein the correction picture generation processor generates the correction picture to satisfy the following equations:

$$R(\text{correction}) = R(\text{red}) \times (1 - \alpha(\text{red})) / \alpha(\text{red})$$

$$G(\text{correction}) = G(\text{green}) \times (1 - \alpha(\text{green})) / \alpha(\text{green})$$

$$B(\text{correction}) = B(\text{blue}) \times (1 - \alpha(\text{blue})) / \alpha(\text{blue})$$

where $\alpha(\text{red})$, $\alpha(\text{green})$ and $\alpha(\text{blue})$ are color correction factors for correction of brightness of each of the red color component, green color component and blue color component in a picture stored in the storage, $R(\text{red})$, $G(\text{green})$ and $B(\text{blue})$ are brightnesses of each of the red color component, green color component and blue color component of the source picture, and $R(\text{correction})$, $G(\text{correction})$ and $B(\text{correction})$ are brightnesses of each of the red color component, green color component and blue color component of the correction picture.

11. A head-up display, comprising:
a HUD storage that stores color correction factors used for correcting brightness of each color component of a red color component, a green color component and a blue color component included in a picture;
a correction picture generation processor that obtains a source picture imaged by a vehicle-mounted camera from the vehicle-mounted camera which is mounted on a vehicle with a driver aboard to image scenery seen by the driver, and performs color correction processing to generate a correction picture, the color correction processing being performed for enhancing a color component with a relatively low color correction factor of the color correction factors stored in the storage, among the red color component, green color component and blue color component forming the source picture;
a HUD picture display assembly that displays the correction picture in the field of view of the driver under a condition where the driver is able to perceive an outside world; and
a special picture processor that performs picture processing for overlaying the correction picture and the source picture on each other for display,
wherein the head-up display further has a color correction factor receiver that accepts inputs from a user in order to acquire color correction factors for correcting brightness of each of the red color component, green color component and blue color component of a picture, and
the color correction factor receiver causes the picture display assembly to display a test screen that includes: a red display region for display of red color; a green display region for display of green color; a blue display region for display of blue color; and an adjuster feature for adjustment of a ratio of brightness respective in the red display region, green display region and blue display region, and acquires a color correction factor of each of the red color component, green color component and blue color component of a picture on the basis of instructions input by the user through the adjuster feature.

12. The head-up display according to claim 8, further comprising:
a light sensor that detects brightness of a pixel in which each of the red color component, green color component and blue color component is maximized, among pixels forming the picture generated by the correction picture generation processor; and
a light quantity adjustment processor that turns on a light source device for each of red, green and blue colors of the picture display assembly according to the brightness detected by the light sensor of which each of the red color component, green color component and blue color component is maximized.

13. The head-up display according to claim 8, further comprising
an edge detecting and shading processor that detects, as an edge, pixels in which values of brightness and color component of each pixel forming the picture generated by the correction picture generation processor change abruptly as compared with surrounding pixels, and performs shading processing to blur a periphery of the detected edge.

14. A head-up display, comprising:
a HUD storage that stores color correction factors used for correcting brightness of each color component of a red color component, a green color component and a blue color component included in a picture;
a correction picture generation processor that obtains a source picture imaged by a vehicle-mounted camera from the vehicle-mounted camera which is mounted on a vehicle with a driver aboard to image scenery seen by the driver, and performs color correction processing to generate a correction picture, the color correction processing being performed for enhancing a color component with a relatively low color correction factor of the color correction factors stored in the storage, among the red color component, green color component and blue color component forming the source picture;
a HUD picture display assembly that displays the correction picture in the field of view of the driver under a condition where the driver is able to perceive an outside world; and
a special picture processor that performs picture processing for overlaying the correction picture and the source picture on each other for display,
wherein the special picture processor is an eye-position-based special picture processor that performs picture processing for aligning a size and position of a picture display area for display of the correction picture with a size and position of an imaged area of the source picture, on the basis of an eye position detected by an eye position detector that is mounted on the vehicle to detect a position of an eye of the driver.

* * * * *